(12) United States Patent
Hase et al.

(10) Patent No.: US 8,465,877 B2
(45) Date of Patent: Jun. 18, 2013

(54) ALKALI METAL AIR BATTERY

(75) Inventors: Yoko Hase, Nagoya (JP); Tohru Shiga, Okazaki (JP); Mitsuru Nakano, Nagoya (JP); Kensuke Takechi, Nagoya (JP); Norihiko Setoyama, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 959 days.

(21) Appl. No.: 12/382,651

(22) Filed: Mar. 20, 2009

(65) Prior Publication Data

US 2009/0239113 A1 Sep. 24, 2009

(30) Foreign Application Priority Data

Mar. 24, 2008 (JP) ................. 2008-075464
Jul. 25, 2008 (JP) ................. 2008-192297
Jul. 29, 2008 (JP) ................. 2008-194964
Jan. 19, 2009 (JP) ................. 2009-008532

(51) Int. Cl.
*H01M 8/22* (2006.01)
(52) U.S. Cl.
USPC ........................................... 429/403
(58) Field of Classification Search
USPC ........................................... 429/403
See application file for complete search history.

(56) References Cited

U.S. PATENT DOCUMENTS

2005/0170247 A1* 8/2005 Nakahara et al. ............. 429/213
2008/0176124 A1 7/2008 Imagawa et al.
2008/0299456 A1 12/2008 Shiga et al.

FOREIGN PATENT DOCUMENTS

| JP | 2000-268861 A | * | 9/2000 |
|---|---|---|---|
| JP | A-2002-151084 | | 5/2002 |
| JP | A-2003-7357 | | 1/2003 |
| JP | A-2005-166685 | | 6/2005 |
| JP | A-2005-228712 | | 8/2005 |
| JP | A-2006-286414 | | 10/2006 |

OTHER PUBLICATIONS

Ogasawara et al. "Rechargeable Li2O2 Electrode for Lithium Batteries" Journal of the American Chemical Society, 2006, vol. 128, pp. 1390-1393.*
Machine Translation of JP 2000-268861 A, 2000.*
Ogasawara et al., "Rechargeable $Li_2O_2$ Electrode for Lithium Batteries," *J. Am. Chem. Soc.*, 2006, pp. 1390-1393, vol. 128, No. 4, American Chemical Society.
Ogoshi et al., "Chemically-Responsive Sol-Gel Transition of Supramolecular Single-Walled Carbon Nanotubes (SWNTs) Hydrogel Made by Hybrids of SWNTs and Cyclodextrins," *J. Am. Chem. Soc.*, 2007, pp. 4878-4879, vol. 129, No. 16, American Chemical Society.
Nakahara et al., "Rechargeable batteries with organic radical cathodes," *Chemical Physics Letters*, Jun. 27, 2002, pp. 351-354, vol. 359, Elsevier Science B.V.
Japanese Office Action mailed Jan. 11, 2011 issued in Japanese Patent Application No. 2008-194964 (with partial translation).

* cited by examiner

*Primary Examiner* — Joseph Kosack
(74) *Attorney, Agent, or Firm* — Oliff & Berridge, PLC

(57) ABSTRACT

A F-type electrochemical cell, which is a lithium air battery, includes a positive electrode facing a negative electrode composed of metallic lithium with a separator provided therebetween in a casing. Air is capable of flow to the positive electrode. A nonaqueous electrolytic solution is charged into a space between the positive electrode and the negative electrode. At least one of the positive electrode and the nonaqueous electrolytic solution of the lithium air battery contains a compound having a stable radical skeleton. The compound also serves as a redox catalyst for oxygen.

20 Claims, 9 Drawing Sheets

ALKALI METAL AIR BATTERY

BACKGROUND OF THE INVENTION

1. Field of the Invention

The present invention relates to an alkali metal air battery.

2. Description of the Related Art

Hitherto, it has been known that alkali metal air batterys include negative electrodes capable of occluding and discharging lithium ions, positive electrodes using oxygen in air as positive-electrode active material and containing redox catalysts, and ion-conducting media arranged between the negative electrodes and the positive electrodes. For example, a lithium air battery described in Non-patent Document 1 includes metallic lithium serving as a negative electrode and a mixture of lithium peroxide, porous carbon, a manganese dioxide catalyst, and a fluorocarbon resin, the mixture serving as a positive electrode. The lithium air battery has a discharge potential of 2.5 to 2.7 V, a charge potential of 4.2 to 4.4 V, a discharge capacity per carbon of about 1,000 mAh/g (at a current density of 70 mA/g per carbon). In an air battery, lithium oxide that is formed during discharging and disappears during charging has a thermodynamically calculated potential of about 3.0 V. Thus, the charging potential is significantly high.

In the case where the charging potential is significantly higher than the discharging potential, if the capacity is not changed during charge and discharge, the charge energy is much higher than the discharge energy because energy is expressed as the product of a voltage and a capacity; hence, charge and discharge efficiency is low. In this regard, in Non-patent Document 1, the charging potential is about 4.5 V when the positive electrode does not contain a manganese dioxide catalyst, whereas the charging potential is in the range of about 4.2 to 4.4 V when the positive electrode contain the manganese dioxide catalyst. The use of the manganese dioxide catalyst reduces the charging potential, improving the charge and discharge efficiency. In Non-patent Document 1, the reduction in charge potential is believed to be attributed to the formation of a reaction active species because of manganese dioxide. Patent Document 1 describes that, for example, cobalt phthalocyanine or cobalt porphyrin serving as a catalyst is supported on a surface of a positive electrode.

Patent Document 1: JP 2006-286414 A

Non-patent Document 1: J. Am. Chem. Soc. 2006, Vol. 128, pp. 1390-1393

SUMMARY OF THE INVENTION

In Non-patent Document 1, however, the discharge potential is disadvantageously low because the manganese dioxide catalyst does not contribute to the promotion of the reduction of oxygen molecules during discharge reaction. Furthermore, the absence of lithium peroxide in the positive electrode disadvantageously increases the charging potential to 5.1 V. There is also room for improvement in charge capacity and discharge capacity per carbon. In the method described in Patent Document 1, a reduction in charge potential is still insufficient. Thus, a further reduction in charge potential is desired.

To overcome the foregoing problem, it was an object of the present invention to provide an alkali metal air battery having better battery characteristics than the related art.

To achieve the object described above, the inventors have conducted intensive studies and found that in a lithium air battery including a negative electrode composed of metallic lithium, a positive electrode using oxygen in air as a positive-electrode active material, a nonaqueous electrolytic solution containing a lithium salt, the nonaqueous electrolytic solution being arranged between the negative electrode and the positive electrode, the presence of a compound having a stable radical skeleton (hereinafter, also referred to as a "stable radical compound") in at least one of the positive electrode and the negative electrode contributes to improvement in battery characteristics. This finding has resulted in the completion of the present invention.

That is, an alkali metal air battery of the present invention includes a negative electrode containing a negative-electrode active material, a positive electrode using oxygen as a positive-electrode active material, and a nonaqueous ion-conducting medium configured to conduct alkali metal ions and arranged between the negative electrode and the positive electrode, and further includes a compound having a stable radical skeleton.

According to the alkali metal air battery of the present invention, the compound having a stable radical skeleton is used for the alkali metal air battery. Thus, at least one of the discharging potential, the discharge capacity, the charging potential, and the charge capacity of the alkali metal air battery of the present invention is improved compared with alkali metal air batterys in the related art. Specifically, the alkali metal air battery of the present invention has a higher discharging potential, a lower charging potential, a higher discharge capacity, or a higher charge capacity than lithium air batterys in the related art. The reason for these effects is not clear. The reason for the increase in discharging potential may be that oxygen molecules are activated by the compound having the stable radical skeleton during discharge reaction. The reason for the increase in discharge capacity may be that the compound is not inactivated during discharge reaction because the compound functions as a catalyst that is not changed itself, so that the discharge reaction occurs continuously. The reason for the reduction in charge potential and the increase in charge capacity may be that the compound facilitates a charge reaction to reduce an oxygen overvoltage.

DESCRIPTION OF THE PREFERRED EMBODIMENTS

Figure 1:
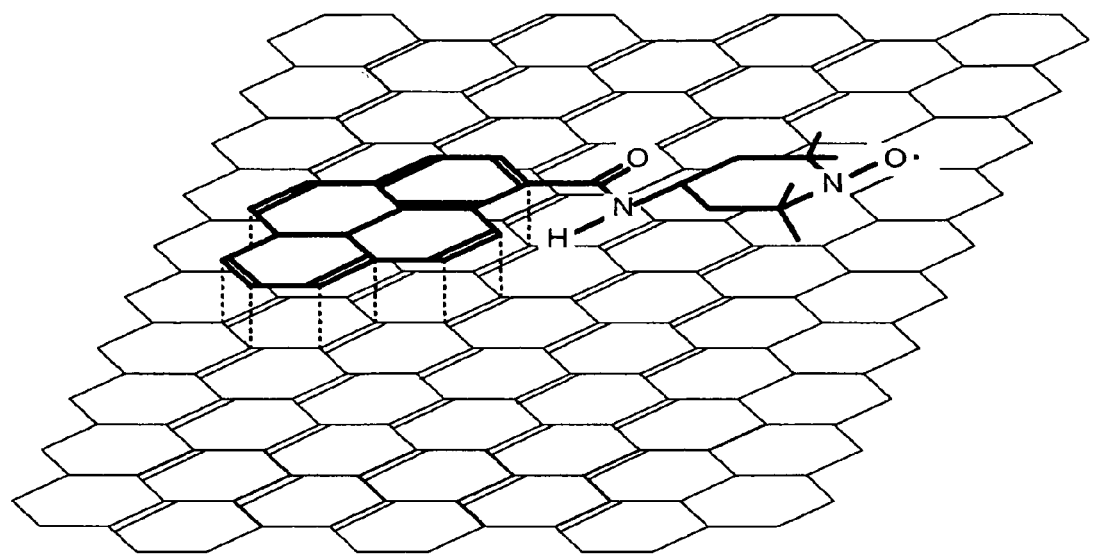
FIG. 1 is a schematic view of a monomolecular redox catalyst having a polycyclic aromatic ring supported on a carbon carrier having a cyclic structure.

An alkali metal air battery of the present invention includes a negative electrode containing a negative-electrode active material, a positive electrode using oxygen as a positive-electrode active material, and a nonaqueous ion-conducting medium configured to conduct alkali metal ions and arranged between the negative electrode and the positive electrode, and further includes a compound having a stable radical skeleton. According to the present invention, the compound having the stable radical skeleton is included in the alkali metal air battery. It is preferable that the compound having the stable radical skeleton is included anywhere in the battery other than in the negative electrode. It is more preferable that the compound having the stable radical skeleton is included in at least one of the positive electrode and the ion-conducting medium. An air battery according to a first embodiment includes a negative electrode containing a negative-electrode active material, a positive electrode containing a compound having a stable radical skeleton and serving as a redox catalyst for oxygen, and a nonaqueous ion-conducting medium arranged between the negative electrode and the positive electrode. An air battery according to a second embodiment includes a negative electrode containing a negative-electrode active material, a positive electrode using oxygen as a positive-electrode active material, and a nonaqueous ion-conducting medium arranged between the negative electrode and the positive electrode and containing a compound having a stable radical skeleton, the compound serving as a redox catalyst for oxygen. In the case where the positive electrode does not contain a redox catalyst for oxygen, the ion-conducting medium may contain a compound having a structure including a stable radical skeleton and a polycyclic aromatic ring linked to the radical skeleton, in which the compound serving as a redox catalyst for oxygen. An air battery according to a third embodiment includes a negative electrode containing a negative-electrode active material, a positive electrode using oxygen as a positive-electrode active material and containing a redox catalyst for oxygen, and a nonaqueous ion-conducting medium arranged between the negative electrode and the positive electrode and containing a compound having a structure including a stable radical skeleton. The negative-electrode active material is not particularly limited as long as it can be used for an alkali metal air battery. Examples of the negative-electrode active material that can be used include lithium, sodium, and potassium. Here, for convenience of description, an air battery including a negative-electrode active material capable of occluding and discharging lithium, i.e., a lithium air battery, will be mainly described below.

First Embodiment

In a lithium air battery of the present invention, the negative electrode is capable of occluding and discharging lithium ions. Examples of a material constituting the negative electrode include metallic lithium, lithium alloys, metal oxides, metal sulfides, and carbonaceous materials capable of occluding and discharging lithium ions. Examples of lithium alloys include an alloy of lithium with aluminum, tin, gallium, magnesium, indium or calcium. Examples of metal oxides include tin oxide, silicon oxide, titanium oxide, niobium oxide, and tungsten oxide. Examples of metal sulfides include tin sulfide and titanium sulfide. Examples of carbonaceous materials capable of occluding and discharging lithium ions include graphite, coke, mesophase pitch-based carbon fiber, spherical carbon, and carbon obtained by baking a resin.

In the lithium air battery of the present invention, the positive electrode uses oxygen as a positive-electrode active material and contains a compound serving as a redox catalyst for oxygen and having a stable radical skeleton. Oxygen serving as the positive-electrode active material may be contained in air or oxygen gas. Here, the term "stable radical skeleton" is used to indicate a skeleton can be present as a radical for long periods of time. For example, the stable radical skeleton may have a spin density of determined by electron spin resonance spectroscopy of $10^{19}$ spins/g or more and preferably $10^{21}$ spins/g or more. The stable radical skeleton may be a thermodynamically stable radical skeleton. The stable radical skeleton is preferably selected from the group consisting of skeletons having nitroxyl radicals, skeletons having oxy radicals, skeletons having nitrogen radicals, skeletons having sulfur radicals, skeletons having carbon radicals, and skeletons having boron radicals. Specific examples thereof include skeletons having nitroxyl radicals of formulae (1) to (9); skeletons having a phenoxy radical (oxy radical) of formula (10); skeletons having hydrazyl radicals (nitrogen radicals) of formulae (11) to (13); and skeletons having carbon radicals of formulae (14) and (15). Among these, skeletons having nitroxyl radicals are particularly preferred. For example, one selected from the group consisting of a 2,2,6,6-tetraalkyl-1-oxylpiperidinyl skeleton (see formula (1)), a 2,2,5,5-tetraalkyl-1-oxylpyrrolinyl skeleton (see formula (2)), and 2,2,5,5-tetraalkyl-1-oxylpyrrolidinyl skeleton (see formula (3)) is preferred. The compound having a stable radical skeleton may be a polymer or a monomolecular compound. The monomolecular compound is preferred because it is well dispersed in the positive electrode without aggregation to sufficiently exhibit a redox catalytic function.

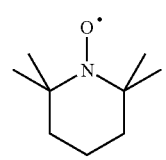

(1)

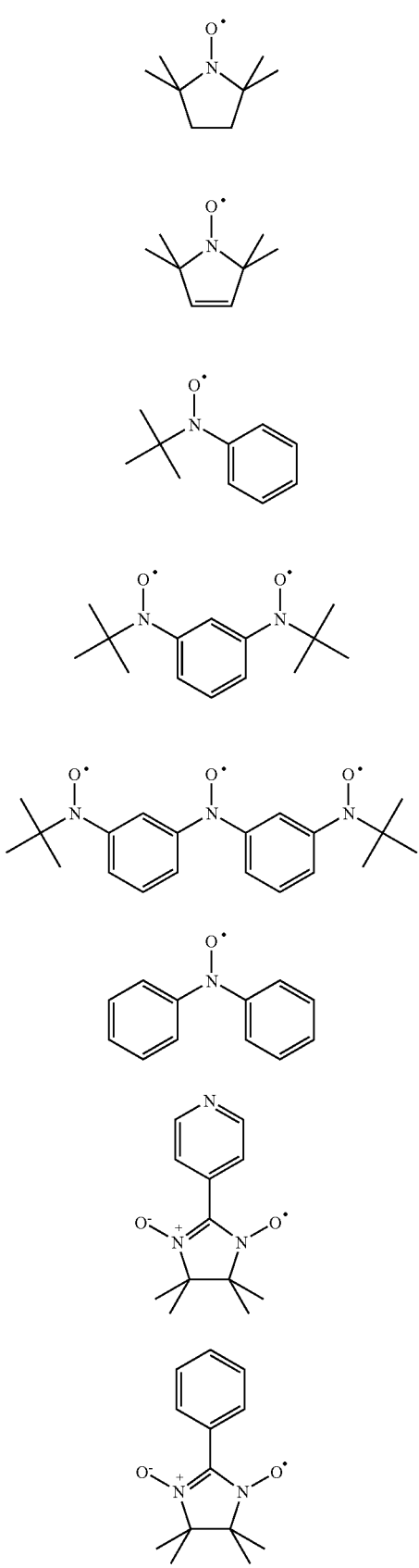
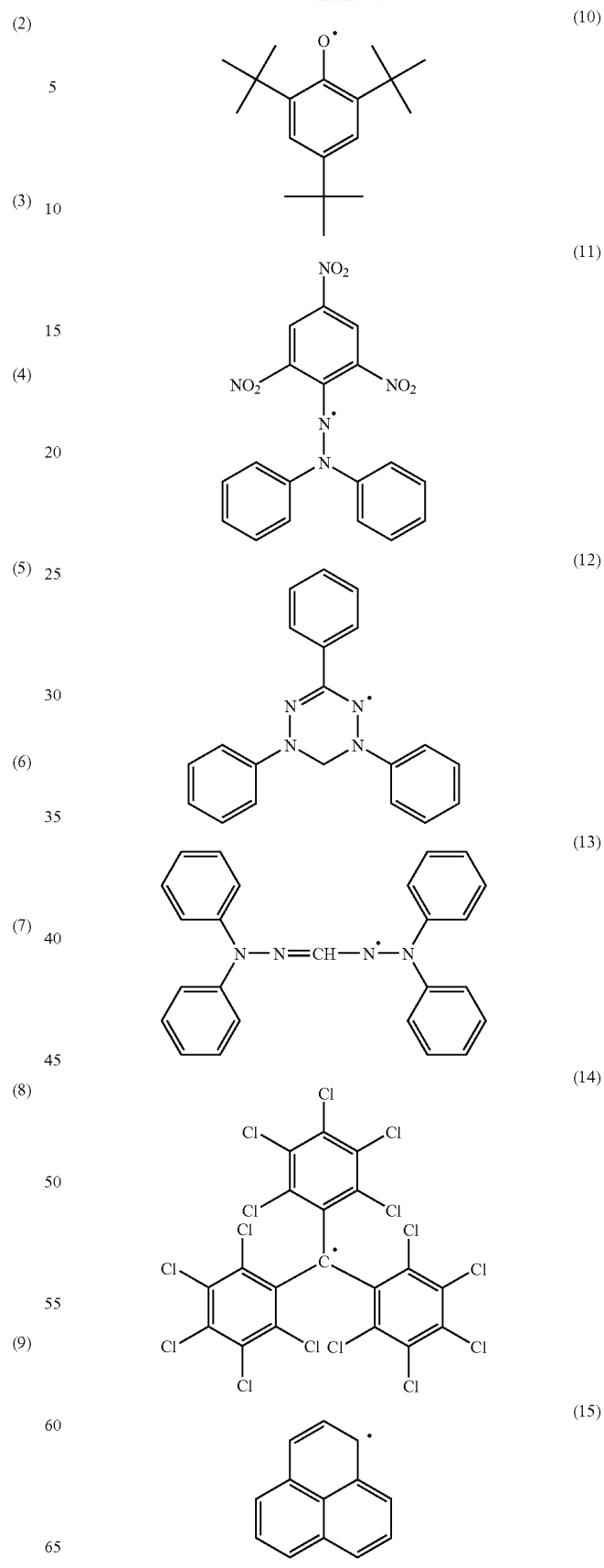

In the lithium air battery of the present invention, the redox catalyst may be composed of a compound having a structure in which a polycyclic aromatic ring is linked to the stable radical skeleton. For example, the polycyclic aromatic ring is preferably selected from the group consisting of naphthalene, phenalene, triphenylene, anthracene, perylene, phenanthrene, and pyrene. Pyrene is particularly preferred. The polycyclic aromatic ring may be linked to the radical skeleton with a spacer selected from the group consisting of an amide bond, an ester bond, urea bond, a urethane bond, a carbamide bond, an ether bond, and a sulfide bond. The polycyclic aromatic ring may be directly linked to the radical skeleton without using the spacer. The polycyclic aromatic ring linked to the radical skeleton with the spacer is preferred because of easy synthesis. An alkyl chain may be arranged between the polycyclic aromatic ring and the spacer or between the radical skeleton and the spacer. One polycyclic aromatic ring may be linked to one radical skeleton. Alternatively, a plurality of polycyclic aromatic rings may be linked to one radical skeleton. In this case, the plurality of polycyclic aromatic rings may be all the same, all different, or partially different. One polycyclic aromatic ring may be linked to a plurality of radical skeletons. In this case, the plurality of radical skeletons may be all the same, all different, or partially different. The radical skeleton may have a single radical or a plurality of radicals in its skeleton.

In the lithium air battery of the present invention, the positive electrode may be a component in which the redox catalyst is supported on a carrier. An example of the carrier is carbon. Examples of carbon include carbon blacks, such as Ketjen Black, acetylene black, channel black, furnace black, lamp black, and thermal black; graphite, such as natural graphite, e.g., scaly graphite, artificial graphite, and expanded graphite; activated carbon from charcoal and coal; carbon fibers obtained by carbonizing synthetic fibers and petroleum pitch-based materials; molecular carbon such as fullerenes; and tubular carbon, such as carbon nanotubes. The positive electrode preferably, has a catalyst content of 0.01% to 60% by weight, preferably 55% by weight or less, and more preferably 0.01% to 50% by weight with respect to the total weight of the positive electrode. At a catalyst content of 0.01% by weight or more, the effect of the catalyst is sufficiently exhibited. At a catalyst content of 60% by weight or less, the proportions of other components such as a conductive material and a binder incorporated in the positive electrode are not excessively low, thus preventing reductions in conductivity and mechanical strength. Such carbon may also serve as a conductive material (details will be described below).

In the lithium air battery of the present invention, preferably, the redox catalyst is monomolecularly supported on a carrier. The term "monomolecularly supported" is used to indicate that the redox catalyst is supported on the carrier in a monomolecular state without aggregation. All molecules of the redox catalyst may be monomolecularly supported. Alternatively, some molecules may be monomolecularly supported. More preferably, the redox catalyst is more monomolecularly supported from the viewpoint of successfully exhibiting the catalytic function. The redox catalyst is preferably supported on the carrier by ultrasonic irradiation treatment. For example, as described in J. Am. Chem. Soc. 2007, vol. 129, pp. 4878-4879, the redox catalyst can be supported on the carrier in a molecular state by the ultrasonic irradiation treatment. For example, the ultrasonic irradiation treatment may be performed by preparing a mixture of the redox catalyst, the carrier, and a solvent and irradiating the resulting mixture with ultrasound using an ultrasonic generator. The mixture is filtered to provide the redox catalyst supported on the carrier. The mixture preferably contains 10% to 50% by weight of the catalyst with respect to the weight of the carrier. Preferred examples of the solvent include organic solvents such as acetone and alcohol. The ultrasonic irradiation time can be set in the range of, for example, 1 to 10 hours. The redox catalyst monomolecularly supported is preferably composed of a compound having a structure in which a polycyclic aromatic ring is linked to a stable radical skeleton. The carrier is preferably composed of a carbonaceous material having a cyclic structure and more preferably having a π bond. In this case, the catalyst is supported on the carrier by the π-π interaction between the polycyclic aromatic ring and the cyclic structure of the carbonaceous material in the redox catalyst and thus easily monomolecularly supported, which is preferred. The redox catalyst is preferably composed of a compound having, for example, a naphthalene ring, an anthracene ring, a phenanthrene ring, or a pyrene ring as the polycyclic aromatic ring. In particular, a compound having a pyrene ring is preferred. Preferred examples of the carrier include carbon materials having cyclic structures, such as carbon blacks, graphite, and tubular carbon. FIG. 1 is a schematic view of a redox catalyst having a polycyclic aromatic ring monomolecularly supported on a carbon carrier having a cyclic structure.

In the lithium air battery of the present invention, the positive electrode may contain a conductive material. The conductive material is not particularly limited as long as it is electrically conductive. Examples thereof include foregoing carbon blacks, graphite, and activated carbon, and carbon fibers. Furthermore, examples thereof include conductive fibers such as metal fibers; metal powders, such as silver, nickel, aluminum powders; and organic conductive materials such as polyphenylene derivatives. These may be used separately or in combination as a mixture. Moreover, the positive electrode may contain lithium oxide or lithium peroxide.

In the lithium air battery of the present invention, the positive electrode may contain a binder. The binder is not particularly limited. The binder may be composed of a thermoplastic resin or a thermosetting resin. Examples thereof include polyethylene, polypropylene, polytetrafluoroethylene (PTFE), polyvinylidene fluoride (PVDF), styrene-butadiene rubber, tetrafluoroethylene-hexafluoroethylene copolymers, tetrafluoroethylene-hexafluoropropylene copolymers (FEP), tetrafluoroethylene-perfluoroalkyl vinyl ether copolymers (PFA), vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, vinylidene fluoride-perfluoromethyl vinyl ether-tetrafluoroethylene copolymers, and ethylene-acrylic acid copolymers. These materials may be used separately or in combination as a mixture.

In the lithium air battery of the present invention, the positive electrode may be formed by, for example, mixing the catalyst and the carrier (and the conductive material and the binder, as needed) and combining the resulting mixture with a current collector by press forming. To readily diffuse oxygen, the current collector is preferably formed of a porous component having a network structure or a mesh structure. The current collector may be formed of a porous metal sheet composed of stainless steel, nickel, or aluminum. To prevent oxidation, the current collector may be covered with a film composed of an oxidation resistant metal or alloy. The current collector may be a member in which a single layer or a multiple layers composed of a transparent material, e.g., InSnO$_2$, SnO$_2$, ZnO, or In$_2$O$_3$, or impurity-doped material, e.g., fluorine-doped tin oxide (SnO$_2$:F), antimony-doped tin oxide (SnO$_2$:Sb), tin-doped indium oxide (In$_2$O$_3$:Sn), aluminum-doped zinc oxide (ZnO:Al), or gallium-doped zinc oxide (ZnO:Ga) is arranged on a glass component or a polymer component. The single layer or the multiple layers preferably have a thickness of 3 nm to 10 µm without limitation. The glass component or the polymer component may have a flat surface or uneven surface.

In the lithium air battery of the present invention, the nonaqueous ion-conducting medium arranged between the negative electrode and the positive electrode may be, for example, a nonaqueous electrolytic solution containing a supporting electrolyte. Non-limiting examples of the supporting electrolyte that can be used include known supporting electrolytes, such as LiPF$_6$, LiClO$_4$, LiAsF$_6$, LiBF$_4$, Li(CF$_3$SO$_2$)$_2$N, Li(CF$_3$SO$_3$), and LiN(C$_2$F$_5$SO$_2$)$_2$. These supporting electrolytes may be used separately or in combination. The concentration of the supporting electrolyte is preferably in the range of 0.1 to 2.0 M and more preferably 0.8 to 1.2 M. The nonaqueous electrolytic solution may be an aprotic organic solvent. Examples of the aprotic organic solvent include cyclic carbonates, chain carbonates, cyclic esters, cyclic ethers, and chain ethers. Examples of cyclic carbonates include ethylene carbonate, propylene carbonate, butylene carbonate, and vinylene carbonate. Examples of chain carbonates include dimethyl carbonate, diethyl carbonate, and methyl ethyl carbonate. Examples of cyclic ester carbonates include γ-butyrolactone and γ-valerolactone. Examples of cyclic ethers include tetrahydrofuran and 2-methyltetrahydrofuran. Examples of chain ethers include dimethoxyethane and ethylene glycol dimethyl ether. These may be used separately or in combination as a mixture. Other examples of the nonaqueous electrolytic solution that can be used include nitrile solvents, such as acetonitrile, propylnitrile, and 3-methoxypropionitrile; ionic liquids, such as N-methyl-N-propylpiperidinium bis(trifluoromethanesulfonyl)imide and N,N,N-trimethyl-N-propylammonium bis(trifluoromethanesulfonyl)imide; and gel electrolytes.

The lithium air battery of the present invention may have a separator arranged between the lithium negative electrode and the positive electrode. The separator is not particularly limited as long as it has a composition that can withstand service conditions of the lithium air battery. Examples of the separator include polymer nonwoven fabrics such as polypropylene nonwoven fabrics and polyphenylene sulfide nonwoven fabrics; and microporous films composed of olefin resins such as polyethylene and polypropylene. These may be used separately or in combination.

The shape of the lithium air battery of the present invention is not particularly limited. Examples thereof include coin shapes, button shapes, sheet shapes, and laminate shapes. The lithium air battery may have large shapes for use in electric cars and the like.

The lithium air battery of the present invention may be used as a primary battery or a rechargeable secondary battery.

In the lithium air battery according to the first embodiment of the present invention, the compound having the stable radical skeleton is used as the redox catalyst. Thus, at least one of the discharging potential, the discharge capacity, the charging potential, and the charge capacity of the alkali metal air battery of the present invention is improved compared with alkali metal air batterys in the related art. Specifically, the alkali metal air battery of the present invention has a higher discharging potential, a lower charging potential, a higher discharge capacity, or a higher charge capacity than lithium air batterys in the related art. The reason for these effects is not clear. The reason for the increase in discharging potential may be that oxygen molecules are activated by the compound having the stable radical skeleton during discharge reaction. The reason for the increase in discharge capacity may be that the compound is not inactivated during discharge reaction because the compound functions as a catalyst that is not changed itself, so that the discharge reaction occurs continuously. The reason for the reduction in charge potential and the increase in charge capacity may be that the compound facilitates a charge reaction to reduce an oxygen overvoltage.

Second Embodiment

A lithium air battery according to a second embodiment of the present invention includes a negative electrode containing a negative-electrode active material, a positive electrode using oxygen as a positive-electrode active material, and a nonaqueous ion-conducting medium arranged between the negative electrode and the positive electrode and containing a compound having a stable radical skeleton, the compound serving as a redox catalyst for oxygen. In the lithium air battery according to the second embodiment, the positive electrode need not contain the redox catalyst because the ion-conducting medium contains the redox catalyst. In the lithium air battery according to the second embodiment, the negative electrode (negative-electrode active material), the positive electrode (e.g., the positive-electrode active material, the conductive material, the binder, and the current collector), the separator, the nonaqueous ion-conducting medium (the supporting electrolyte and the nonaqueous electrolytic solution), and the like described in the first embodiment may be used. The lithium air battery according to the second embodiment may have the same shape as that exemplified in the first embodiment. The lithium air battery according to the second embodiment may be used as a primary battery or a rechargeable secondary battery. In the lithium air battery according to the second embodiment, the positive electrode may be formed by, for example, mixing the conductive material, the binder, and the like (not including the redox catalyst) and combining the resulting mixture with a current collector by press forming.

In the lithium air battery of the present invention, the nonaqueous ion-conducting medium contains the compound having the stable radical skeleton and serving as a redox catalyst for oxygen. Examples of the stable radical skeleton include exemplary skeletons described in the first embodiment, e.g., skeletons of formulae (1) to (15). Among these, skeletons having nitroxyl radicals are particularly preferred. For example, the skeleton selected from formulae (1) to (3) is preferred. The compound having the stable radical skeleton may be a polymer or a monomolecular compound as long as it can dissolve in the electrolytic solution described above. The monomolecular compound dissolves in the ion-conducting medium (e.g., electrolytic solution) to be uniformly dispersed. In this case, the redox catalytic function is sufficiently provided, which is preferred. In the lithium air battery of the present invention, a compound having a structure including the stable radical skeleton and a polycyclic aromatic ring linked to the stable radical skeleton is preferably contained in the nonaqueous ion-conducting medium. In this case, the battery characteristics can be further improved. For example, the compound having the structure including the stable radical skeleton and a polycyclic aromatic ring linked to the stable radical skeleton described in the first embodiment may be used. That is, for example, the polycyclic aromatic ring and the spacer in the redox catalyst, the linking state of thereof, and combinations thereof described in the first embodiment may be used.

In the lithium air battery of the present invention, when the redox catalyst in the nonaqueous ion-conducting medium is composed of a monomolecular compound, the redox catalyst content is preferably in the range of 0.0001 mol/L to 1.0 mol/L and more preferably 0.001 mol/L to 0.1 mol/L. At a redox catalyst content of 0.0001 mol/L or more, the effect of the catalyst is sufficiently exhibited. At a redox catalyst content of 1.0 mol/L or less, the influence on other components (e.g., supporting electrolyte) in the ion-conducting medium can be suppressed. Alternatively, when the redox catalyst is composed of a polymer compound, the ion-conducting medium preferably has a redox catalyst content of 0.001% to 10% by weight with respect to the total weight of the ion-conducting medium. At a redox catalyst content of 0.001% by weight or more, the effect of the catalyst is sufficiently exhibited. At a redox catalyst content of 10% by weight or less, the influence on other components (e.g., supporting electrolyte) in the ion-conducting medium can be suppressed.

The lithium air battery may be used as a primary battery. Preferably, the lithium air battery is used as a rechargeable secondary battery. For example, in the case where the ion-conducting medium is a nonaqueous electrolytic solution, the redox catalyst is movably dispersed in the nonaqueous electrolytic solution. Thus, the contact probability between the lithium oxide formed on the positive electrode and the redox catalyst is higher than that in the case where the redox catalyst is fixed on the positive electrode. In this case, the redox reaction of lithium in the repetition of charge and discharge is readily promoted, which is preferred.

In the lithium air battery according to the second embodiment of the present invention, the compound having the stable radical skeleton, more preferably, the compound having the structure including the stable radical skeleton and the polycyclic aromatic ring linked to the radical skeleton is used as the redox catalyst and is contained in the nonaqueous ion-conducting medium. Thus, at least one of the discharging potential, the discharge capacity, the charging potential, and the charge capacity of the lithium air battery of the present invention is improved compared with lithium air batterys in the related art. Specifically, the alkali metal air battery of the present invention has a higher discharging potential, a lower charging potential, a higher discharge capacity, or a higher charge capacity than lithium air batterys in the related art. The reason for these effects is not clear. The reason for the increase in discharging potential may be that oxygen molecules are activated by the compound during discharge reaction. The reason for the increase in discharge capacity may be that the compound is not readily inactivated during discharge reaction because the compound functions as a catalyst that is not changed itself, so that the discharge reaction occurs continuously. The reason for the reduction in charge potential and the increase in charge capacity may be that the compound promotes a charge reaction to reduce an oxygen overvoltage.

Third Embodiment

A lithium air battery according to a third embodiment of the present invention includes a negative electrode containing a negative-electrode active material, a positive electrode using oxygen as a positive-electrode active material and containing a redox catalyst for oxygen, and a nonaqueous ion-conducting medium arranged between the negative electrode and the positive electrode and containing a compound having a structure including a stable radical skeleton. In the lithium air battery according to the third embodiment, the positive electrode contains the redox catalyst and the compound having a structure including a stable radical skeleton functioning as a redox catalyst for oxygen. In this case, the redox catalyst in the positive electrode may contain a compound having a structure including a stable radical skeleton. In the lithium air battery according to the third embodiment, the negative electrode (negative-electrode active material), the positive electrode (e.g., the positive-electrode active material, the conductive material, the binder, and the current collector), the separator, the nonaqueous ion-conducting medium (the supporting electrolyte and the nonaqueous electrolytic solution), and the like described in the first embodiment may be used. The amount of the binder is preferably 3 to 15 with respect to 100 of the total weight of the conductive material supporting the catalyst. The lithium air battery according to the third embodiment may have the same shape as that exemplified in the first embodiment. The lithium air battery according to the third embodiment is used as a rechargeable secondary battery but may be used as a primary battery.

In the lithium air battery of the present invention, the positive electrode contains the redox catalyst for oxygen. Examples of a material of the redox catalyst for oxygen include metal oxides, such as manganese dioxide and tricobalt tetraoxide; metals, such as Pt, Pd, and Co; and organic and inorganic compounds, such as metal porphyrins, metal phthalocyanines, and ionized fullerene. Among these, electrolytic manganese dioxide is preferred from the viewpoint of easy availability. The redox catalyst for oxygen may be composed of a stable radical c having a structure including a stable radical skeleton. Examples of the stable radical skeleton include skeletons exemplified in the first embodiment, e.g., skeletons of formulae (1) to (15). Among these, skeletons having nitroxyl radicals are particularly preferred. For example, the skeleton selected from formulae (1) to (3) is preferred. Preferably, the stable radical compound used as the redox catalyst for oxygen in the positive electrode is not dissolved in the electrolytic solution. More preferably, the stable radical compound is a polymer. The stable radical compound is still more preferably compound X that is a radical polymer having a nitroxyl radical. The stable radical compound content is preferably about 50% by weight and more preferably 54% by weight with respect to the amount of a positive electrode mixture.

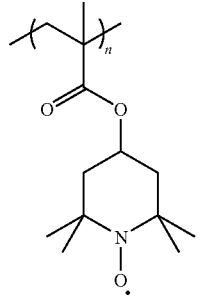

Compound X

In the lithium air battery of the present invention, the nonaqueous electrolytic solution contains a compound having a structure including a stable radical skeleton. Examples of the stable radical skeleton include skeletons exemplified in the first embodiment, e.g., skeletons of formulae (1) to (15). Among these, skeletons having nitroxyl radicals are particularly preferred. For example, the skeleton selected from formulae (1) to (3) is preferred. In particular, 2,2,6,6-tetramethylpiperidine 1-oxyl skeleton (see formula (1)) is preferred. The stable radical compound may be a polymer or a monomolecular compound as long as it can dissolve in the electrolytic solution described above. The monomolecular compound dissolves in the ion-conducting medium to be uniformly dispersed and is thus preferred.

In the lithium air battery of the present invention, the stable radical compound in the nonaqueous electrolytic solution may be a compound that can be dissolved in the electrolytic solution. For example, the stable radical compound may be a compound in which the stable radical skeleton is linked to at least one selected from hydrogen, an aromatic ring, an amino group, an alkyl group, an alkoxy group, a fluoroalkyl group, and a fluoroalkoxy group. In particular, a compound in which the stable radical skeleton is linked to at least one selected from hydrogen, an aromatic ring, and an amino group is preferred. An example of a compound in which the stable radical skeleton is linked to an aromatic ring is N-(3,3,5,5-tetramethyl-4-oxylpiperidyl)pyrene-1-carboxyamide (compound A) and is preferred because the radical is more stable. An example of a compound in which the stable radical skeleton is linked to hydrogen is 2,2,6,6-tetramethylpiperidine 1-oxyl (compound B) and is preferred from the viewpoint of easy availability. An example of a compound in which the stable radical skeleton is linked to an amino group is 4-amino-2,2,6,6-tetramethylpiperidine 1-oxyl (compound C) and is preferred because of a lower charging potential. The aromatic ring may be monocyclic or polycyclic. The polycyclic aromatic rings exemplified in the first embodiment may be used. That is, for example, the polycyclic aromatic ring and the spacer linked to the stable radical skeleton the linking state of thereof, and combinations thereof described in the first embodiment may be used.

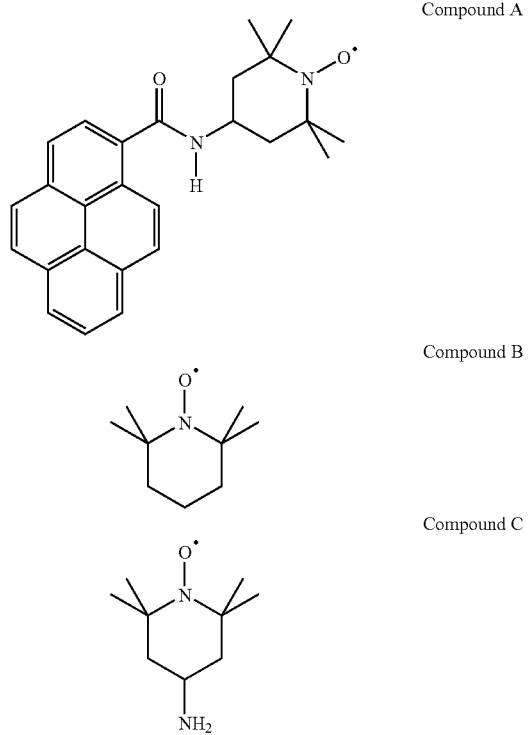

Compound A

Compound B

Compound C

In the lithium air battery of the present invention, in the case where the stable radical compound is a monomolecular compound, the amount of the stable radical compound is preferably in the range of 0.01 mmol to 0.25 mmol and more preferably 0.018 mmol to 0.25 mmol in the nonaqueous electrolytic solution. At 0.01 mmol or more of the stable radical compound, the effect of reducing the charging potential is provided. At 0.25 mmol or less of the stable radical compound, the influence on other components (e.g., supporting electrolyte) in the electrolytic solution is suppressed. Furthermore, 0.25 mmol or less of the stable radical compound is preferred also from the viewpoint of a reduction in cost. In the case where the electrolytic solution has a volume of about 5 mL, the concentration of the stable radical compound is preferably in the range of 0.002 mol/L to 0.05 mol/L and more preferably 0.0036 mol/L to 0.05 mol/L. In the case where the electrolytic solution has a volume of less than 5 mL, preferably, the absolute amount of the stable radical compound (0.01 mmol to 0.25 mmol) is preferentially ensured. In the case where the stable radical compound is a polymer, the nonaqueous electrolytic solution preferably has a stable radical compound content of 0.001% to 10% by weight with respect to the total weight of the nonaqueous electrolytic solution. A stable radical compound content of 0.001% by weight or more results in the sufficient effect of reducing the charging potential. A stable radical compound content of 10% by weight or less results in suppression of the influence on other components (e.g., supporting electrolyte).

In the lithium air battery of the present invention, for example, in the case where compound B is used as the stable radical compound and where compound X is used as the positive electrode catalyst, the use of 3-methoxypropionitrile as a solvent for the nonaqueous electrolytic solution results in a further reduction in charging potential and is thus preferred. In the case where compound B is used, compound X is preferably used as the positive electrode catalyst.

In the lithium air battery according to the third embodiment of the present invention, the redox catalyst for oxygen is contained in the positive electrode, and the compound having a structure including the stable radical skeleton is contained in the nonaqueous electrolytic solution, thereby further reducing the charging potential. The reason for the reduction in charging potential may be that the synergistic effect of the redox catalyst and the compound having a structure including the stable radical skeleton promotes a charge reaction to reduce an oxygen overvoltage.

The present invention is not limited to these embodiments described above. It should be understood that various modifications may be made without departing from the scope of the invention.

For example, in the foregoing embodiments, the lithium air batterys containing the negative-electrode active material capable of occluding and discharging lithium have been described. The negative-electrode active material is not particularly limited as long as it can be used for air batterys. In the case where at least one of the positive electrode and the ion-conducting medium contains the compound having the stable radical skeleton, the structures described in the first, second and third embodiments may be appropriately combined.

The above-described embodiments regard air batteries in which the compound having the stable radical skeleton is contained in at least one of the positive electrode and the ion-conducting medium. However, the compound having the stable radical skeleton may be contained in anywhere in the battery, for example, in a separator.

EXAMPLES

Examples of the production of a nonaqueous alkali metal air battery of the present invention will be described below. An example of the production of a lithium air battery according to the first embodiment, i.e., a lithium air battery having a positive electrode containing a compound having a stable radical skeleton, the compound serving as a redox catalyst, will be described.

Example 1

A poly(2,2,6,6-tetramethylpiperidinyloxy methacrylate) radical was used as a redox catalyst. According to Chem. Phys. Lett. Vol. 359, p. 351 (2002), the polymer was prepared by polymerizing 2,2,6,6-tetramethylpiperidine methacrylate monomer with 2,2'-azobisisobutyronitrile as an initiator and oxidizing the resulting polymer with 3-chloroperbenzoic acid. The radical had a number-average molecular weight of 92,000 and a weight-average molecular weight of 229,000. The polymer has a 2,2,6,6-tetramethylpiperidoxyl radical (TEMPO radical) as a radical skeleton. The TEMPO radical is known as a stable radical skeleton (for example, see Japanese Unexamined Patent Application Publication No. 2002-151084).

Figure 2:
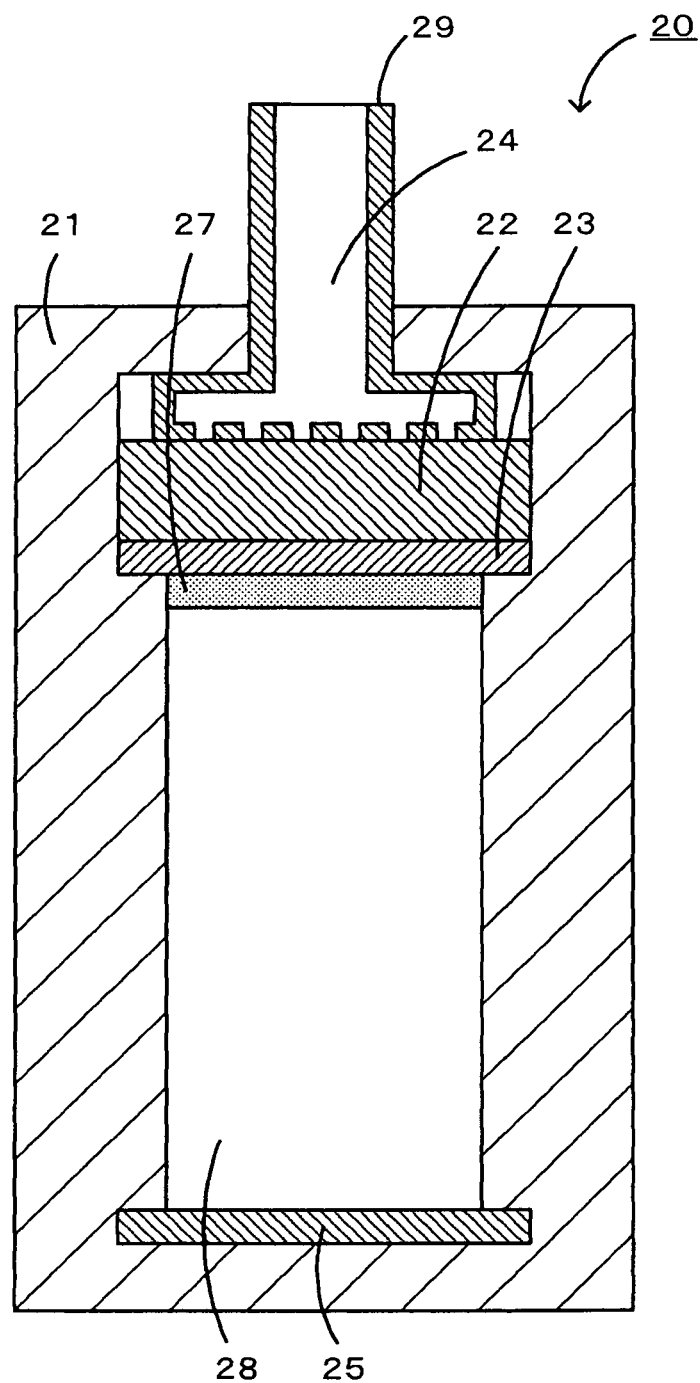
FIG. 2 is cross-sectional view of an F-type electrochemical cell 20.

A positive electrode was produced as follows: First, 5 mL of N-methyl-2-pyrrolidone was added to 50 parts by weight of the redox catalyst described above and 100 parts by weight of Ketjen Black (ECP-600JD, manufactured by Mitsubishi Chemical Corporation) to form a suspension, followed by kneading with a mortar. After removal of N-methyl-2-pyrrolidone by evaporation, 5 parts by weight of a Teflon powder (manufactured by Daikin Industries, Ltd., and "Teflon" is a registered trademark (hereinafter, the same is true of the following description)) was added thereto. The resulting mixture was mixed and formed into a thin film. The film was weighed so as to contain 5 mg of carbon, press-bonded to a nickel mesh, and dried in vacuo to form the positive electrode for a lithium air battery. A metallic lithium component (manufactured by Honjo Metal Co., Ltd.) having a diameter of 10 mm and a thickness of 0.5 mm was used as a negative electrode. An F-type electrochemical cell 20 (manufactured by Hokuto Denko Corporation) was assembled from these components. FIG. 2 shows the F-type electrochemical cell 20.

Figure 3:
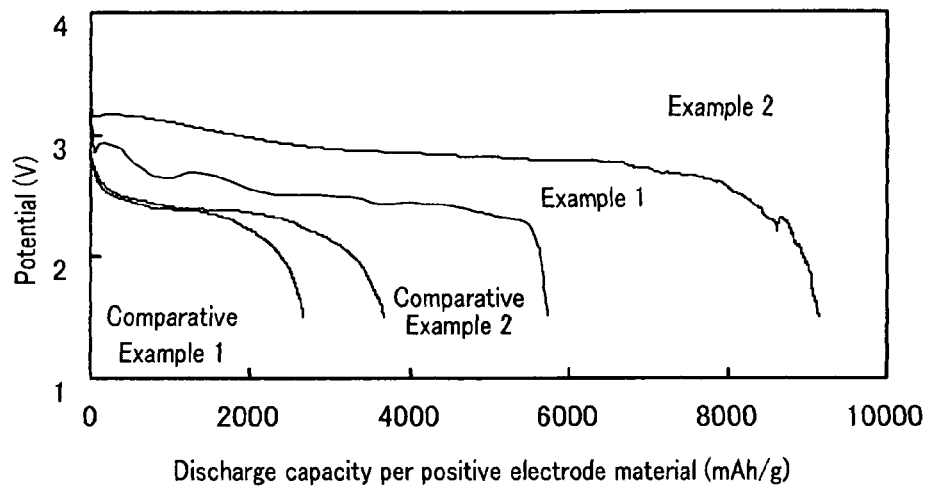
FIG. 3 is a graph showing the relationship between the voltage and the discharge capacity in a discharge test.

The F-type electrochemical cell 20 was assembled as follows: A negative electrode 25 was arranged on a casing 21 composed of stainless steel. A positive electrode 23 was arranged so as to face the negative electrode 25 with a separator 27 (trade name: E25MMS, manufactured by Tapyrus Co., Ltd.) provided therebetween. A nonaqueous electrolytic solution 28 prepared by dissolving lithium hexafluorophosphate in a solution (manufactured by Tomiyama Pure Chemical Industries, Ltd.) containing 30 parts by weight of ethylene carbonate and 70 parts by weight of diethyl carbonate so as to have a lithium hexafluorophosphate content of 1 M was injected into a space between the positive electrode 23 and the negative electrode 25. A foamed nickel plate 22 was placed on the positive electrode 23. The foamed nickel plate 22 was pressed by a pressing member 29 in which air can pass therethrough toward the positive electrode 23 to hold the cell. Thereby, the F-type electrochemical cell 20 in Example 1 was assembled. Although not shown in the figure, the casing 21 could be separated into an upper portion in contact with the positive electrode 23 and a lower portion in contact with the negative electrode 25 and had an insulating resin arranged between the upper portion and the lower portion. The positive electrode 23 and the negative electrode 25 were electrically insulated with the insulating resin. A gas reservoir 24 of the F-type cell was charged with dry oxygen. The resulting F-type electrochemical cell 20 was attached to a charge/discharge unit (Model HJ1001SM8A, manufactured by Hokuto Denko Corporation). The cell was discharged at a current of 0.1 mA flowing between the positive electrode 23 and the negative electrode 25 until the open end voltage reached 1.5 V. The discharge test was performed at 25° C. FIG. 3 shows a discharge curve. Table 1 shows an average voltage and a discharge capacity during discharge. The average voltage during discharge shown in Table 1 was defined as the average of discharge voltages until the discharge capacity reached 1,000 mAh/g.

Example 2

N-(3,3,5,5-Tetramethyl-4-oxylpiperidyl)pyrene-1-carboxamide (compound A) in which pyrene and a 2,2,6,6-tetramethyl-1-oxylpiperidinyl group was linked with an amide bond was synthesized as a redox catalyst. Compound A was synthesized as follows: In an argon atmosphere, 246 mg of 1-hydroxycarbonylpyrene (manufactured by Sigma-Aldrich Corp.) was placed in a 100-mL two-necked round-bottom flask and dissolved by the addition of 6 mL of N,N-dimethylformamide (DMF). Subsequently, each of 304 mg of 4-(4,6-dimethoxy-1,3,5-triazin-2-yl)-4-methylmorpholinium chloride (DMT-MM, and 188 mg of 4-amino-2,2,6,6-tetramethyl-1-oxylpiperidine (manufactured by Tokyo Chemical Industry Co., Ltd.) was dissolved in 15 mL of methanol and added thereto. The resulting mixture was allowed to react under stirring for 24 hours. After completion of the reaction, removal of the solvent by evaporation afforded a reaction product. The reaction product was dissolved in 50 mL of chloroform. Extraction was performed with water (10 mL×2), 1 N aqueous hydrochloric acid (10 mL), and brine (10 mL). The organic phase was dehydrated over anhydrous magnesium sulfate to afford a crude product. The resulting crude product was purified by silica-gel chromatography, resulting in 260 mg of an orange solid.

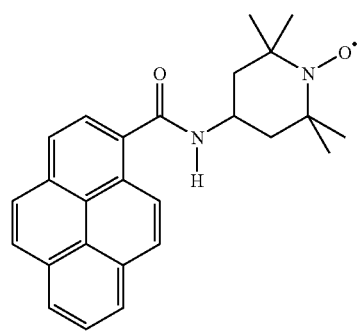

Compound A

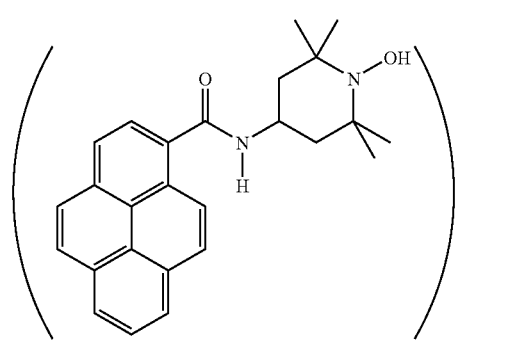

Compound a

The measurement results of IR spectrum of the resulting solid demonstrated peaks at 3265, 1634, and 1548 cm$^{-1}$ attributed to an amide structure. A peak of 399.2 corresponding to $M^+$ ions was observed by field desorption mass spectrometry. Compound A was reduced to form N-(3,3,5,5-tetramethyl-4-hydroxylpiperidyl)pyrene-1-carboxamide (compound a). The structure of Compound a was determined by $^1$H-NMR. Compound A was reduced as follows: After 36 mg of compound A was dissolved in a solvent containing 0.4 mL each of ethanol and chloroform, 23 mg of (D)-isoascorbic acid (manufactured by Wako Pure Chemical Industries, Ltd.) dissolved in 40 μL of water was added thereto. The mixture was allowed to react at room temperature for 30 minutes. The organic phase of the reaction solution was extracted with chloroform. The extracted organic phase was dehydrated and dried over magnesium sulfate. Removal of the solvent by evaporation afforded 29 mg of an orange solid. The product was determined to be compound A from the $^1$H-NMR spectral data of the resulting solid. The spectral data of compound a is described below.

$^1$H-NMR (CDCl$_3$, 500 MHz): δ 1.15-2.35 (m, 4CH$_3$+ 2CH$_2$, 16H), 4.55-4.75 (br, CH, 1H), 7.91-8.37 (m, aromatic, 8H), 8.48-8.72 (m, aromatic+NH+OH, 3H).

Based on the foregoing results, we determined that target compound A was obtained. Measurement of the electron spin resonance spectrum showed that the spin density of compound A was calculated to be $1.41 \times 10^{21}$ spins/g and 94% of the nitroxyl groups in the compound were present as stable radicals. The spin density of compound A was calculated as follows: The spin density was measured with an ESR spectrometer (Model ESP350E, manufactured by Bruker Corporation) at a microwave output of 0.25 mW, a frequency of 9.79 GHz, a central magnetic field of 3487 G, a sweep width of 300 G, and a sweep time of 83.886 s. The integrated absorption intensity was determined by integrating the first derivation ESR spectrum obtained by the above-described method four times. The spin density was determined by comparison with the integrated absorption intensity of a known sample measured under the same conditions.

A positive electrode was produced as follows: 5 mL of methanol was added to 50 parts by weight of the foregoing redox catalyst and 100 parts by weight of Ketjen Black (ECP-600JD, manufactured by Mitsubishi Chemical Corporation) to form a suspension, followed by kneading with a mortar. After removal of methanol by evaporation, 5 parts by weight of a Teflon powder (manufactured by Daikin Industries, Ltd.) was added thereto. The resulting mixture was mixed and formed into a thin film. The film was weighed so as to contain 5 mg of carbon, press-bonded to a nickel mesh, and dried in vacuo to form the positive electrode for a lithium air battery. Other components were produced as in Example 1, and a lithium air battery in Example 2 was produced. The resulting lithium air battery was subjected to discharge test as in Example 1. FIG. 3 shows the discharge curve. Table 1 shows the average voltage and the discharge capacity during discharge.

Figure 4:
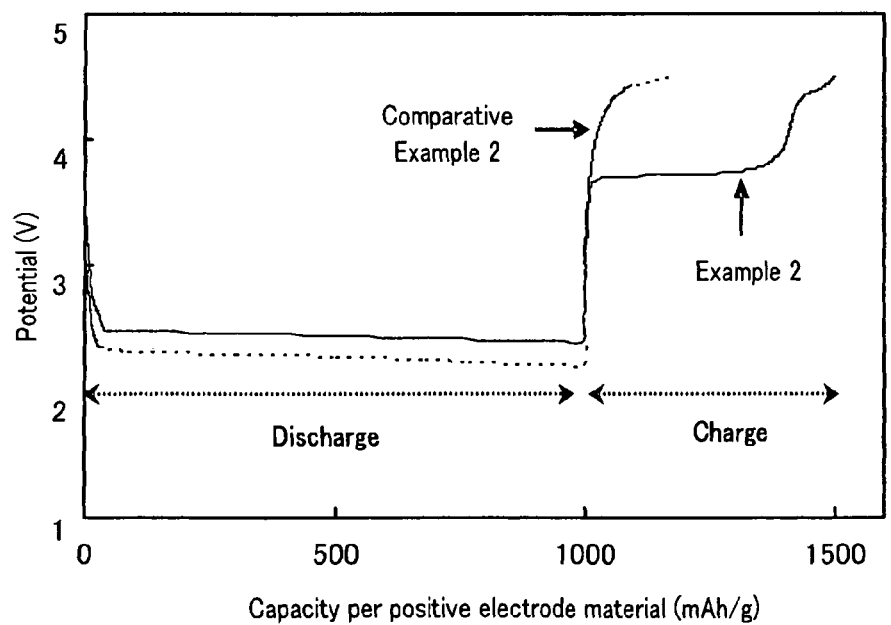
FIG. 4 is a graph showing the relationship between the voltage and the discharge capacity in a discharge and charge test.

Furthermore, a lithium air battery in Example 2 was similarly produced. The following charge-discharge test was performed. The F-type electrochemical cell 20 shown in FIG. 2 was attached to a charge/discharge unit (manufactured by Hokuto Denko Corporation). The cell was discharged at a current of 0.2 mA flowing between the positive electrode 23 and the negative electrode 25 until the discharge capacity reached 1,000 mAh/g. Subsequently, the cell was charged at a current of 0.2 mA flowing between the positive electrode 23 and the negative electrode 25 until the open end voltage reached 4.5 V. The charge-discharge test was performed at 25° C. FIG. 4 shows the charge-discharge curve.

Comparative Example 1

A lithium air battery in Comparative Example 1 was produced as in Example 1, except that the positive electrode was produced by mixing 95 parts by weight of Ketjen Black (ECP-600JD, manufactured by Mitsubishi Chemical Corporation) and 2.4 parts by weight of a Teflon powder (manufactured by Daikin Industries, Ltd.), forming the mixture into a thin film, weighing the thin film so as to contain 5 mg of carbon, press-bonding the thin film to a nickel mesh, and performing vacuum drying. The resulting lithium air battery was subjected to a discharge test as in Example 1. FIG. 3 shows the discharge curve. Table 1 shows the average voltage and the discharge capacity during discharge.

Comparative Example 2

A lithium air battery in Comparative Example 2 was produced as in Example 1, except that the positive electrode was produced by kneading 2.5 parts by weight of manganese dioxide (manufactured by Mitsui Mining & Smelting Co., Ltd.) and 95 parts by weight of Ketjen Black (ECP-600JD, manufactured by Mitsubishi Chemical Corporation) with a mortar, adding 2.4 parts by weight of a Teflon powder (manufactured by Daikin Industries, Ltd.) thereto, mixing the resulting mixture, forming the mixture into a thin film, weighing the thin film so as to contain 5 mg of carbon, press-bonding the thin film to a nickel mesh, and performing vacuum drying. The resulting lithium air battery was subjected to a discharge test as in Example 1. FIG. 3 shows the discharge curve. Table 1 shows the average voltage and the discharge capacity during discharge. Furthermore, the same charge-discharge test as in Example 2 was performed. FIG. 4 shows the charge-discharge curve.

TABLE 1

| | Average Voltage[1] V | Discharge capacity mAh/g |
|---|---|---|
| Example 1 | 2.62 | 5700 |
| Example 2 | 2.87 | 9130 |
| Comparative Example 1 | 2.51 | 2660 |
| Comparative Example 2 | 2.52 | 3665 |

[1]Average of discharge voltages until the discharge capacity reaches 1,000 mAh/g.

Table 1 and FIG. 3 clearly showed that in the lithium air battery provided with the positive electrode containing the compound having a stable radical skeleton as the redox catalyst in each of Examples 1 and 2, a high average voltage and a high discharge capacity were observed during the discharge reaction compared with Comparative Examples 1 and 2. In particular, the redox catalyst in Example 2 was composed of a monomolecular compound and dispersed in the positive electrode without aggregation, sufficiently providing the catalytic function compared with Example 1. Thus, a higher discharge voltage and a higher discharge capacity were probably obtained. FIG. 4 clearly showed that in the lithium air battery in Example 2, a high average voltage was observed during the discharge reaction, and a lower average voltage and a high charge capacity were observed during the charge reaction compared with the lithium air battery in Comparative Example 2.

Japanese Unexamined Patent Application Publication No. 2002-151084 discloses a radical battery including a positive electrode containing a compound having a stable radical skeleton, the compound serving as a positive-electrode active material. The lithium air battery of the present invention also includes a positive electrode containing a compound having a stable radical skeleton but differs from the radical battery in that the compound is not used as a positive-electrode active material but oxygen is used as a positive-electrode active material and in that the compound is used as a redox catalyst for oxygen. In fact, the charge potential and the discharge potential of the radical battery are about 3.5 V, which is significantly different from the charge potential and the discharge potential of the lithium air battery of the present invention. Furthermore, the discharge capacity of the radical battery is significantly different from the lithium air battery of the present invention. The radical battery and the lithium air battery, therefore, are clearly based on different electrochemical reactions.

Examples 3 to 5

Figure 5:
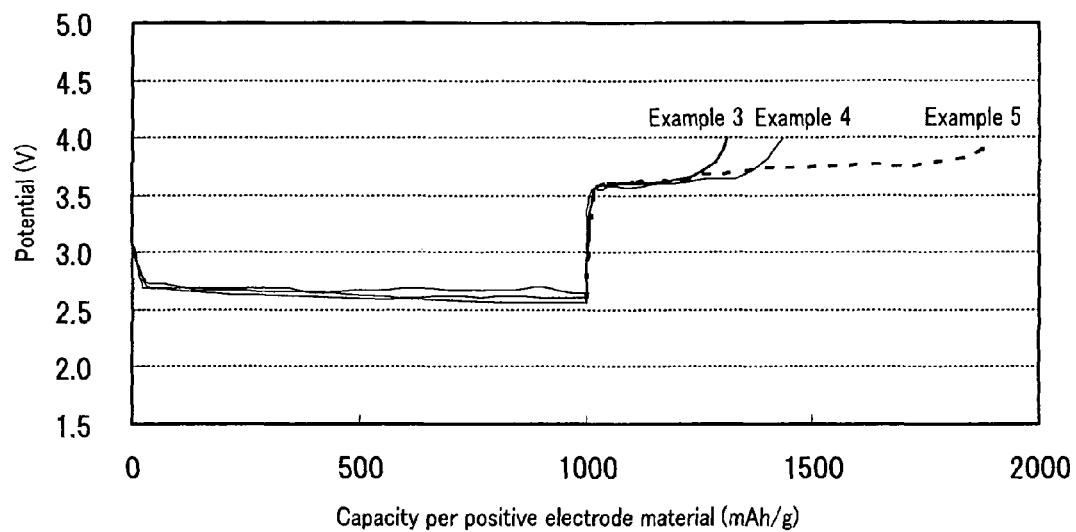
FIG. 5 is a graph showing the relationship between the voltage and the discharge capacity in a discharge and charge test.
Figure 6:
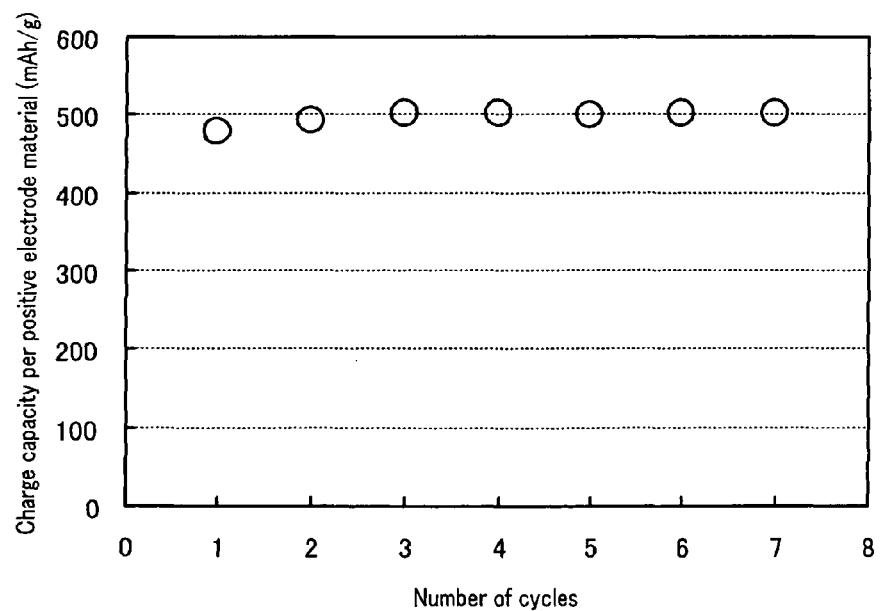
FIG. 6 is a graph showing the relationship between the charge capacity and the number of cycles in a discharge-charge cycle test.

With respect to the positive electrode in Example 1, the amount of the catalyst added and the charge-discharge cycle performance were studied. Positive electrodes were produced as follows: The polymer having the stable radical in Example 1 was used as a redox catalyst. First, 88 parts by weight of the total amount of the redox catalyst and Ketjen Black (ECP-600JD, manufactured by Mitsubishi Chemical Corporation) and 12 parts by weight of a Teflon powder (manufactured by Daikin Industries, Ltd.) were dry kneaded with a mortar to form three types of mixtures having polymer contents of 20% by weight, 41% by weight, and 57% by weight with respect to the total weight of the positive electrode (polymer+Ketjen Black+binder). The mixtures were used as materials of the positive electrodes in Examples 3 to 5. The mixtures were formed into three types of sheets. Each of the sheets was weighed so as to contain 5 mg of carbon and press-bonded to a stainless-steel mesh (manufactured by The Nilaco Corporation), resulting in the positive electrode. A metallic lithium component (manufactured by Honjo Metal Co., Ltd.) having a diameter of 10 mm and a thickness of 0.4 mm was used as a negative electrode. In a glove box under an argon atmosphere, the positive electrode and the negative electrode were arranged, and then lithium air batterys in Examples 3 to 5 were assembled by a procedure the same as in Example 1. As an electrolytic solution, a 1 mol/L lithium bis(trifluoromethanesulfonyl)imide in a mixed solution of ethylene carbonate and diethyl carbonate (manufactured by Tomiyama Pure Chemical Industries, Ltd., the volume mixing ratio of the solvents was 3:7) was used. The lithium air battery was connected to a charge/discharge unit (Model HJ1001SM8A, manufactured by Hokuto Denko Corporation). The battery was discharged at a current of 0.1 mA flowing between the positive electrode and the negative electrode until the discharge capacity reached about 1,000 mAh/g around the positive electrode material. Then the battery was charged at a backward current of 0.05 mA until the battery voltage reached 4 V. Table 2 and FIG. 5 show the results. In the lithium air battery including the positive electrode (with a polymer content of 57% by weight) in Example 5, the battery was discharged at a current of 0.1 mA flowing between the positive electrode and the negative electrode until the discharge capacity reached about 500 mAh/g around the positive electrode material. Then the battery was charged at a backward current of 0.05 mA until the battery voltage reached 4 V. FIG. 6 shows a change in charge capacity when the discharge-charge cycle is repeated seven times.

TABLE 2

|  | Catalyst amount[1] % by weight | Charge capacity[2] mAh/g |
| --- | --- | --- |
| Example 3 | 20 | 314 |
| Example 4 | 41 | 432 |
| Example 5 | 57 | 907 |

[1]Wight ratio to positive electrode material.
[2]Charge capacity after discharging until 1,000 mAh/g.

Table 2 and FIG. 5 clearly showed that the charge capacity was increased as the amount of the catalyst was increased. FIG. 6 clearly showed that in the discharge-charge cycle test in Example 5, stable charge and discharge was performed.

Example 6

Figure 7:
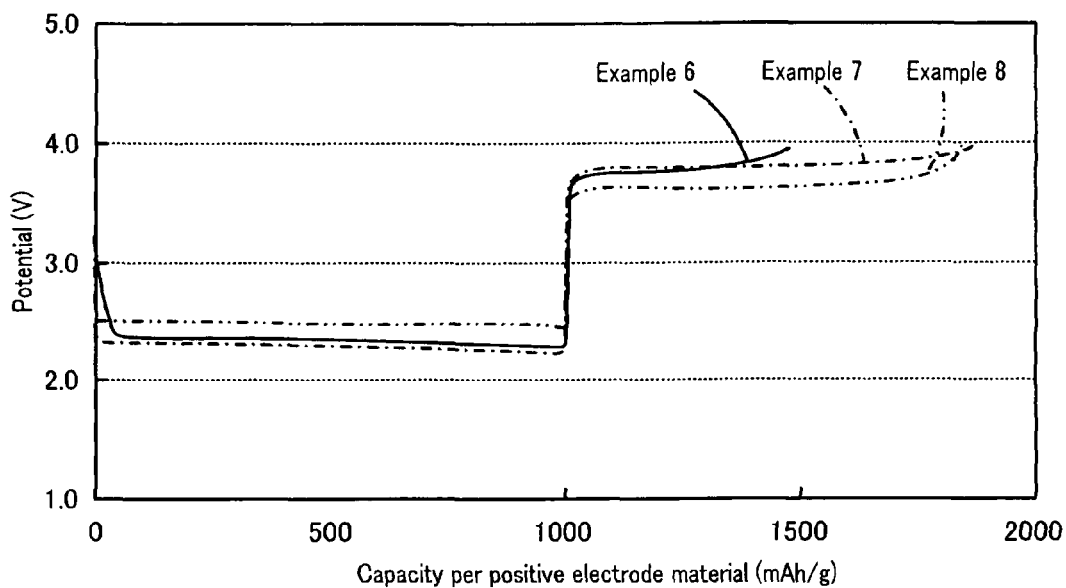
FIG. 7 is a graph showing the relationship between the voltage and the discharge capacity in a discharge and charge test.

With respect to the positive electrode in Example 2, a supporting method of the redox catalyst and the supporting electrolyte were studied. A positive electrode was produced as follows: 40 parts by weight of compound A serving as a redox catalyst and 160 parts by weight of Ketjen Black (ECP-600JD, manufactured by Mitsubishi Chemical Corporation) serving as a carrier for the catalyst and as a conductive material were mixed, followed by the addition of 30 mL of methanol (manufactured by Wako Pure Chemical Industries, Ltd.) to form a suspension. The suspension was subjected to ultrasound for 3 hours with an ultrasonic cleaner (manufactured by AS ONE Corporation). The resulting suspension was filtered, and then the solvent was removed to give compound A supported on Ketjen Black. It was speculated that in the case where the redox catalyst was supported on the carrier by ultrasonic irradiation, at least part of the redox catalyst was monomolecularly supported on the carrier. The amount of the redox catalyst supported was 19% by weight with respect to the weight of the carrier. Then 92 parts by weight of Ketjen Black supporting the catalyst was mixed with 8 parts by weight of Teflon powder polytetrafluoroethylene (manufactured by Daikin Industries, Ltd). The mixture was kneaded with a mortar and then formed into a thin film. The film was weighed so as to contain 5 mg of carbon, press-bonded to a mesh composed of nickel or stainless steel, and dried in vacuo to form the positive electrode for a lithium air battery. The amount of the redox catalyst was 17.60% by weight with respect to the total weight of the positive electrode material (compound A+Ketjen Black+binder). A metallic lithium component (manufactured by Honjo Metal Co., Ltd.) having a diameter of 10 mm and a thickness of 0.4 mm was used as a negative electrode. In a glove box under an argon atmosphere, the positive electrode and the negative electrode were arranged to an F-type electrochemical battery (manufactured by Hokuto Denko Corporation) shown in FIG. 2. As an electrolytic solution, 5 mL of a 1 mol/L lithium hexafluorophosphate in a mixed solution of ethylene carbonate and diethyl carbonate (manufactured by Tomiyama Pure Chemical Industries, Ltd., the volume mixing ratio of the solvents was 3:7) was injected, thereby producing a lithium air battery in Example 6. Dry oxygen was charged into a gas reservoir arranged above a pressing member of lithium air battery. The lithium air battery was connected to a charge/discharge unit (Model HJ1001SM8A, manufactured by Hokuto Denko Corporation). The battery was discharged at a current of 20 mA per gram of the positive electrode material, the current flowing between the positive electrode and the negative electrode until the discharge capacity reached about 1,000 mAh/g. Then the battery was charged at a backward current of 10 mA/g until the battery voltage reached 4 V. FIG. 7 shows the measurement results during the charge and discharge. The amount of the catalyst, the supporting method, the supporting electrolyte, and the charge capacity are summarized in Table 3. Table 3 also shows those in Example 2 described above and Examples 7 and 8 described below. The charge capacity in Example 6 was 480 mAh/g.

Example 7

A lithium air battery in Example 7 was produced as in Example 6, except that as the supporting electrolyte of the electrolytic solution, lithium bis(trifluoromethanesulfonyl) imide was used in place of lithium hexafluorophosphate. The charge capacity was 860 mAh/g.

Example 8

A positive electrode in Example 8 was produced as follows: 19 parts by weight of compound A serving as a redox catalyst and 32 parts by weight of Ketjen Black (ECP-600JD, manufactured by Mitsubishi Chemical Corporation) were mixed, followed by the addition of 10 mL of methanol (manufactured by Wako Pure Chemical Industries, Ltd.) to form a suspension. The suspension was subjected to ultrasound for 3 hours with an ultrasonic cleaner. The resulting suspension was filtered, and then the solvent was removed to give compound A supported on Ketjen Black. The amount of the redox catalyst supported was 32% by weight with respect to the weight of the carrier. Then 92 parts by weight of Ketjen Black supporting the catalyst was mixed with 8 parts by weight of Teflon powder (manufactured by Daikin Industries, Ltd). The mixture was kneaded with a mortar and then formed into a thin film. The film was weighed so as to contain 5 mg of carbon, press-bonded to a nickel mesh, and dried in vacuo to form the positive electrode for a lithium air battery. The amount of the redox catalyst was 29.6% by weight with respect to the total weight of the positive electrode material (compound A+Ketjen Black+binder). A lithium air battery in Example 8 was produced as in Example 6, except that lithium perchlorate in place of lithium hexafluorophosphate was used as the supporting electrolyte of the electrolytic solution. The charge capacity in Example 8 was 872 mAh/g.

TABLE 3

| | Catalyst amount[1] % by weight | Supporting method | Supporting electrode | Charge capacity[2] mAh/g |
|---|---|---|---|---|
| Example 2 | 50 | Mix | $LiPF_6$ | 520 |
| Example 6 | 19 | Ultrasound | $LiPF_6$ | 480 |
| Example 7 | 19 | Ultrasound | $Li(CF_3SO_2)_2N$ | 860 |
| Example 8 | 32 | Ultrasound | $LiClO_4$ | 872 |

[1]Weight ratio to the carrier
[2]Charge capacity after discharging until 1000 mAh/g Table 3 and FIG. 7 clearly shows that the redox catalyst irradiated with ultrasound resulted in a high charge capacity.

Examples of the production of a lithium air battery according to the second embodiment, i.e., a lithium air battery including an ion-conducting medium containing a compound having a stable radical skeleton, will be described below.

Example 9

A positive electrode was produced as follows: 95 parts by weight of Ketjen Black serving as a conductive material (ECP-600JD, manufactured by Mitsubishi Chemical Corporation) was mixed with 2.4 parts by weight of Teflon powder (manufactured by Daikin Industries, Ltd). The mixture was kneaded with a mortar and then formed into a thin film. The film was weighed so as to contain 5 mg of carbon, press-bonded to a nickel mesh, and dried in vacuo to form the positive electrode for a lithium air battery. A metallic lithium component (manufactured by Honjo Metal Co., Ltd.) having a diameter of 10 mm and a thickness of 0.5 mm was used as a negative electrode. The F-type electrochemical battery 20 (manufactured by Hokuto Denko Corporation) shown in FIG. 2 was assembled from these components.

Figure 8:
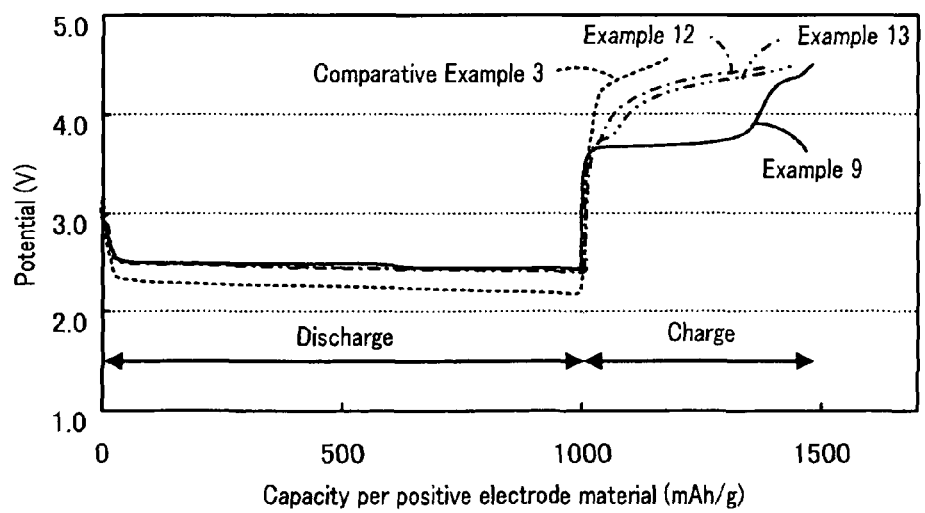
FIG. 8 is a graph showing the relationship between the voltage and the discharge capacity in a discharge and charge test in each of Examples 9, 12, and 13, and Comparative Examples 3 to 5.

First, 8 mg of N-(3,3,5,5-tetramethyl-4-oxylpiperidyl)pyrene-1-carboxamide (compound A) serving as a redox catalyst was dissolved in 10 mL of a solution (manufactured by Tomiyama Pure Chemical Industries, Ltd.) containing 30 parts by weight of ethylene carbonate and 70 parts by weight of diethyl carbonate to prepare a nonaqueous electrolytic solution 28 having a catalyst content of 0.001 M. Lithium hexafluorophosphate serving as a supporting electrolyte was dissolved in the nonaqueous electrolytic solution 28 in a concentration of 1 M. The resulting nonaqueous electrolytic solution 28 was injected into a space between the positive electrode 23 and the negative electrode 25. Other components were produced as in Example 1, and the F-type electrochemical battery 20 shown in FIG. 2 was assembled. The resulting F-type electrochemical battery 20 was attached to a charge/discharge unit (Model HJ1001SM8A, manufactured by Hokuto Denko Corporation). The battery was discharged at a current of 0.2 mA flowing between the positive electrode 23 and the negative electrode 25 until the discharge capacity reached 1,000 mAh/g. Subsequently, the battery was charged at a current of 0.2 mA flowing between the positive electrode 23 and the negative electrode 25 until the open end voltage reached 4.5 V. The charge-discharge test was performed at 25° C. FIG. 8 shows the charge-discharge curve. Table 4 shows the average voltage and the charge capacity during charging and discharging. FIG. 8 and Table 4 also show the data of Examples 10 to 13 and Comparative Example 3 described below. The average voltage during discharge shown in Table 4 was defined as the average of discharge voltages until the discharge capacity reached 1,000 mAh/g, and the average voltage during charge was defined as the average of voltages until the potential reached 4.5 V.

TABLE 4

| | Catalyst | Catalyst amount mol/L | Supporting electrode | Discharge[1] voltage V | Charge[2] voltage V | Charge[3] capacity mAh/g |
|---|---|---|---|---|---|---|
| Example 9 | Compound A[4] | 0.001 | $LiPF_6$ | 2.5 | 3.8 | 500 |
| Example 10 | Compound A | 0.002 | $LiPF_6$ | 2.9 | 4.4 | 50 |
| Example 11 | Compound A | 0.002 | $LiClO_4$ | 2.4 | 3.8 | 1000 |
| Comparative Example 3 | — | — | $LiPF_6$ | 2.35 | 4.2 | 120 |
| Example 12 | Compound B[5] | 0.001 | $LiPF_6$ | 2.5 | 4.1 | 380 |
| Example 13 | Compound C[6] | 0.001 | $LiPF_6$ | 2.5 | 4.1 | 400 |

[1]Average of discharge voltages until the discharge capacity reaches 1,000 mAh/g
[2]Average of charge voltages until the potential reaches to 4.5 V
[3]Charge capacity until discharging 1,000 mAh/g
[4]Compound A: N-(3,3,5,5-tetramethyl-4-oxylpiperidyl)pyrene-1-carboxamide
[5]Compound B: 2,2,6,6-tetramethylpiperidine 1-oxyl
[6]Compound C: 4-amino-2,2,6,6-tetramethylpiperidine 1-oxyl

Comparative Example 3

A lithium air battery in Comparative Example 3 was produced as in Example 9, except that the nonaqueous electrolytic solution contained 1 M lithium hexafluorophosphate serving as a supporting electrolyte and a solution (manufactured by Tomiyama Pure Chemical Industries, Ltd.) containing 30 parts by weight of ethylene carbonate and 70 parts by weight of diethyl carbonate. That is, the lithium air battery in Comparative Example 3 did not contain a redox catalyst. The resulting lithium air battery was subjected to a charge-discharge test as in Example 9. FIG. 8 shows the charge-discharge curve.

Figure 9:
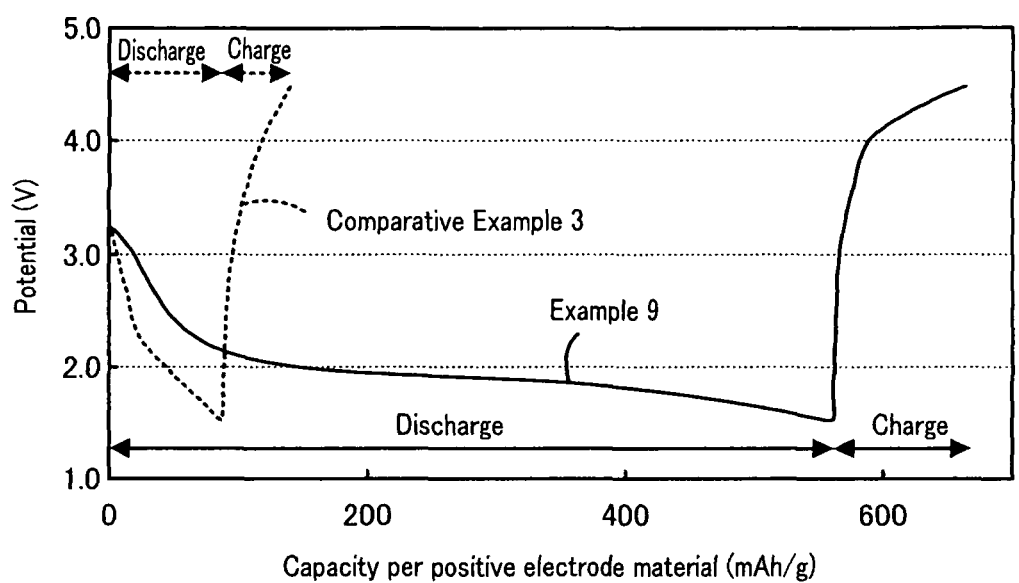
FIG. 9 is a graph showing the relationship between the voltage and the capacity in a discharge and charge test in each of Example 9 and Comparative Example 3.

After each of the lithium air batterys in Example 9 and Comparative Example 3 was subjected to the charge-discharge test, each battery was discharged at a current of 1.0 mA flowing between the positive electrode 23 and the negative electrode 25 at 25° C. until the open end voltage reached 1.5 V. Subsequently, each battery was charged at a current of 1.0 mA flowing between the positive electrode 23 and the negative electrode 25 until the open end voltage reached 4.5 V. FIG. 9 shows the charge-discharge curve. Table 5 shows the discharge capacity and charge capacity of the batterys in Example 9 and Comparative Example 3. The indicated values of the discharge capacity were values during discharge until the potential reached 1.5 V. The indicated values of the charge capacity were values during charge until the potential reached 4.5 V.

TABLE 5

| | Discharge capacity[1] mAh/g | Charge capacity[2] mAh/g |
|---|---|---|
| Example 9 | 570 | 120 |
| Comparative Example 3 | 80 | 30 |

[1] Discharge capacity until the potential reaches 1.5 V at a current of 1.0 mA
[2] Charge capacity until the potential reaches 1.5 V at a current of 1.0 mA

Example 10

Figure 10:
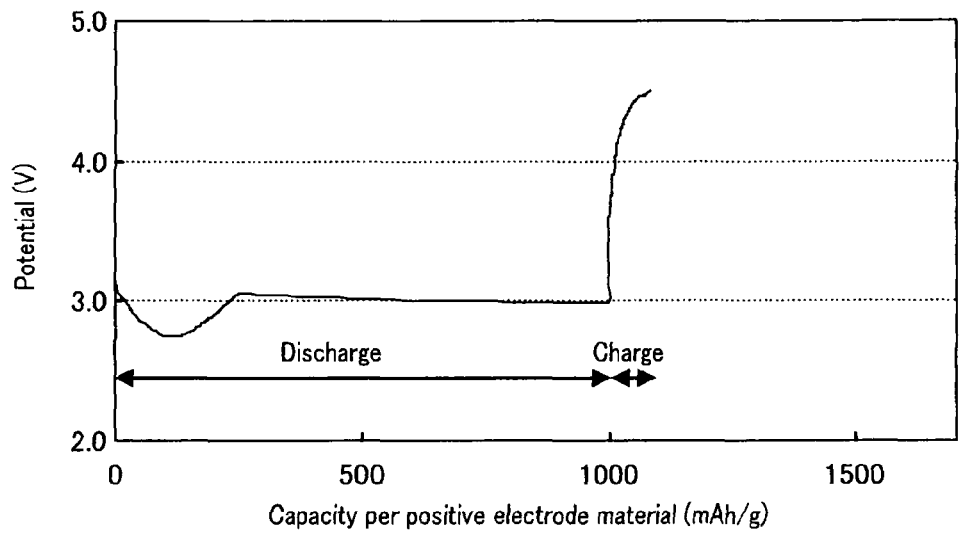
FIG. 10 is a graph showing the relationship between the voltage and the capacity in a discharge and charge test in Example 10.

A lithium air battery in Example 10 was produced as in Example 9, except that the nonaqueous electrolytic solution contained 0.002 M N-(3,3,5,5-tetramethyl-4-oxylpiperidyl)pyrene-1-carboxamide (compound A) serving as a catalyst, 1 M lithium hexafluorophosphate serving as a supporting electrolyte, and a solution (manufactured by Tomiyama Pure Chemical Industries, Ltd.) containing 30 parts by weight of ethylene carbonate and 70 parts by weight of diethyl carbonate. The resulting lithium air battery was subjected to a charge-discharge test as in Example 9. FIG. 10 shows the charge-discharge curve.

Example 11

Figure 11:
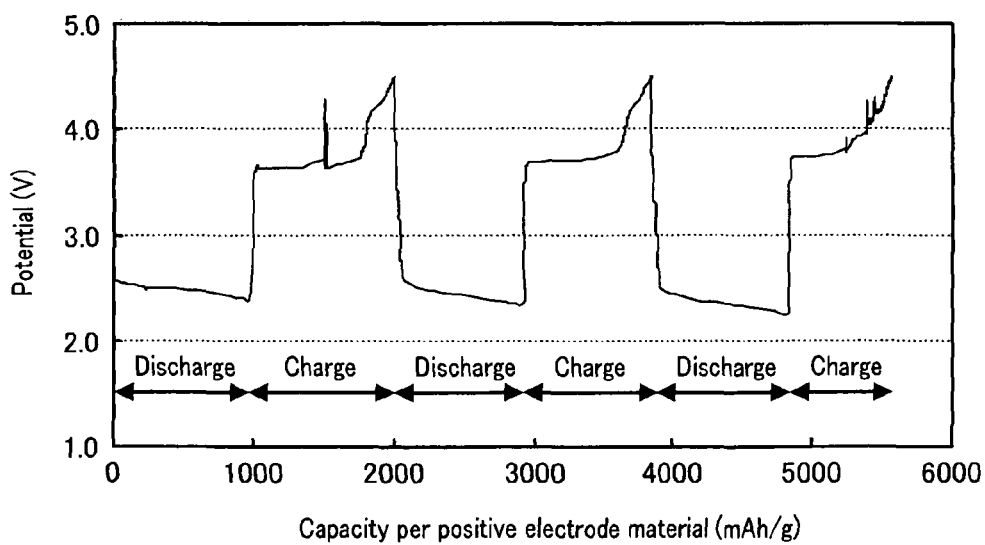
FIG. 11 is a graph showing the relationship between the voltage and the capacity in a discharge-charge cycle test in Example 11.

A lithium air battery in Example 11 was produced as in Example 9, except that the nonaqueous electrolytic solution contained 0.002 M N-(3,3,5,5-tetramethyl-4-oxylpiperidyl)pyrene-1-carboxamide (compound A) serving as a catalyst, 1 M lithium perchlorate serving as a supporting electrolyte, and a solution (manufactured by Tomiyama Pure Chemical Industries, Ltd.) containing 30 parts by weight of ethylene carbonate and 70 parts by weight of diethyl carbonate. The resulting lithium air battery was subjected to a charge-discharge test as in Example 9. The charge-discharge test was repeated three times. FIG. 11 shows the charge-discharge curve.

Example 12

A lithium air battery in Example 12 was produced as in Example 9, except that the nonaqueous electrolytic solution contained 0.001 M 2,2,6,6-tetramethylpiperidine 1-oxyl (compound B) serving as a redox catalyst, 1 M lithium hexafluorophosphate serving as a supporting electrolyte, and a solution (manufactured by Tomiyama Pure Chemical Industries, Ltd.) containing 30 parts by weight of ethylene carbonate and 70 parts by weight of diethyl carbonate. The resulting lithium air battery was subjected to a charge-discharge test as in Example 9. FIG. 8 shows the charge-discharge curve.

Example 13

A lithium air battery in Example 13 was produced as in Example 9, except that the nonaqueous electrolytic solution contained 0.001 M 4-amino-2,2,6,6-tetramethylpiperidine 1-oxyl (compound C) serving as a redox catalyst, 1 M lithium hexafluorophosphate serving as a supporting electrolyte, and a solution (manufactured by Tomiyama Pure Chemical Industries, Ltd.) containing 30 parts by weight of ethylene carbonate and 70 parts by weight of diethyl carbonate. The resulting lithium air battery was subjected to a charge-discharge test as in Example 9. FIG. 8 shows the charge-discharge curve.

Table 4 and FIG. 8 clearly showed that in the lithium air battery including the nonaqueous electrolytic solution containing the compound having a stable radical skeleton and a polycyclic aromatic ring as a redox catalyst in Example 9, a high average voltage during the discharge reaction was observed compared with Comparative Example 3, and a low average voltage during the charge reaction was observed compared with Examples 12 and 13; hence, the battery had a high charge capacity. Also in Examples 12 and 13, a high average voltage during the discharge reaction was observed compared with Comparative Example 3; hence, the battery had a high charge capacity. From the results of the charge-discharge test at a high current (Table 5 and FIG. 9), a high discharge capacity and a high charge capacity were observed in Example 9 compared with Comparative Example 3 in which the same conditions were used. In Example 9, the nonaqueous electrolytic solution containing compound A serving as a redox catalyst showed a pale yellow color. In this regard, 5 mL of methanol was added to 50 parts by weight of the redox catalyst and 100 parts by weight of Ketjen Black to form a suspension, followed by kneading with a mortar. The resulting suspension was press-bonded to a current collector. A battery including the resulting current collector and filled with a solution containing 30 parts by weight of ethylene carbonate and 70 parts by weight of diethyl carbonate was produced. The color of the nonaqueous electrolytic solution was different from the color of the nonaqueous electrolytic solution in Example 9. Thus, in the battery including the positive electrode provided with the redox catalyst, the catalyst was not readily dissolved or almost not dissolved in the nonaqueous electrolytic solution.

Table 4 and FIG. 10 clearly showed that in the lithium air battery including the nonaqueous electrolytic solution containing the compound having a stable radical skeleton and a polycyclic aromatic ring as a redox catalyst in Example 10, a high average voltage during the discharge reaction was observed compared with Comparative Example 3 and the like. Table 4 and FIG. 11 clearly showed that in Example 11, a high charge capacity and a low average charge voltage were observed, and charging and discharging were stably repeated.

Japanese Unexamined Patent Application Publication No. 2002-151084 discloses a radical battery including a positive electrode containing a compound having a stable radical skeleton, the compound serving as a positive-electrode active material. The lithium air battery of the present invention also includes an ion-conducting medium containing a compound having a stable radical skeleton but differs from the radical battery in that the compound is not used as a positive-electrode active material but oxygen is used as a positive-electrode active material and in that the compound is used as a redox catalyst for oxygen. In fact, the charge potential and the discharge potential of the radical battery are about 3.5 V, which is significantly different from the charge potential and the discharge potential of the lithium air battery of the present invention. Furthermore, the discharge capacity of the radical battery is significantly different from the lithium air battery of the present invention. The radical battery and the lithium air battery, therefore, are clearly based on different electrochemical reactions.

Examples of the production of a lithium air battery according to the third embodiment, i.e., a lithium air battery including a positive electrode containing a redox catalyst and an ion-conducting medium containing a compound having a stable radical skeleton, will be described below.

Example 14

A positive electrode was produced as follows: 10 parts by weight of electrolytic manganese dioxide (manufactured by Mitsui Mining & Smelting Co., Ltd.) serving as a catalyst, 85 parts by weight of Ketjen Black (ECP-600JD, manufactured by Mitsubishi Chemical Corporation) serving as a conductive material, and 5 parts by weight of Teflon powder (manufactured by Daikin Industries, Ltd.) serving as a binder were kneaded with a mortar to form a positive electrode mixture. The positive electrode mixture was formed into a thin film. Then 5 mg of the thin film was press-bonded to a stainless-steel mesh (SUS304, manufactured by The Nilaco Corporation) and dried in vacuo to form the positive electrode of a lithium air battery including a nonaqueous electrolytic solution. A metallic lithium component (manufactured by Honjo Metal Co., Ltd.) having a diameter of 10 mm and a thickness of 0.4 mm was used as a negative electrode.

Figure 12:
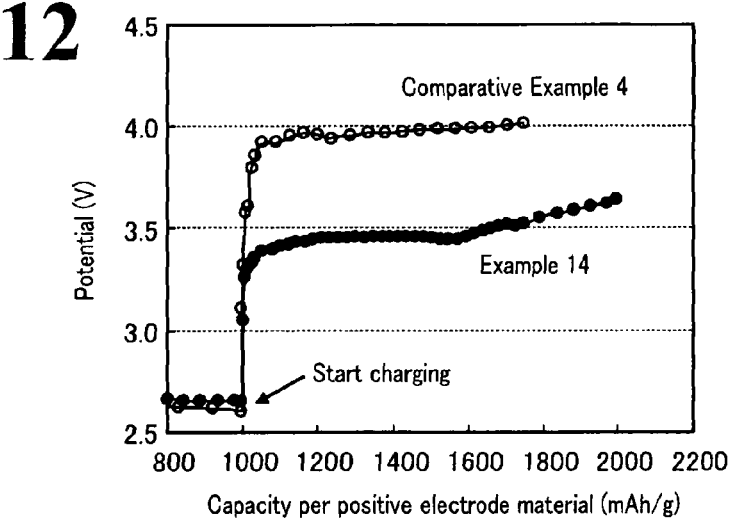
FIG. 12 is a graph showing the relationship between the voltage and the capacity in a charge test in each of Example 14 and Comparative Example 4.

Lithium bistrifluoromethanesulfonylimide was dissolved in a solution (manufactured by Tomiyama Pure Chemical Industries, Ltd.) containing 30 parts by weight of ethylene carbonate and 70 parts by weight of diethyl carbonate in such a manner that the concentration of lithium bistrifluoromethanesulfonylimide was 1 M. Then 0.06 mmol of 2,2,6,6-tetramethylpiperidine 1-oxyl (compound B, manufactured by Tokyo Chemical Industry Co., Ltd., also referred to as "Tempo") was dissolved in 5 mL of the resulting solution to prepare a nonaqueous electrolytic solution 28. The resulting nonaqueous electrolytic solution 28 was injected into a space between the positive electrode 23 and the negative electrode 25. Other components were produced as in Example 1, and the F-type electrochemical battery 20 shown in FIG. 2 was assembled. The resulting F-type electrochemical battery 20 was attached to a charge/discharge unit (Model HJ10001SM8A, manufactured by Hokuto Denko Corporation). The battery was discharged at a current of 20 mA per gram of the positive electrode mixture, the current flowing between the positive electrode 23 and the negative electrode 25 until the discharge capacity reached 1,000 mAh/g. Subsequently, the battery was charged at a current of 10 mA per gram of the positive electrode mixture, the current flowing between the positive electrode 23 and the negative electrode 25 until the open end voltage reached 4.0 V. When the open end voltage did not reach 4.0 V, the battery was charged until the charge capacity reached 1,000 mAh per gram of the positive electrode mixture. The charge-discharge test was performed at 25° C. FIG. 12 shows the charge-discharge curve. FIG. 12 also shows the charging curve in Comparative Example 4 described below. Table 6 shows the results. Table 6 also shows the results in Examples 15 to 21 described below.

TABLE 6

| | Stable radical compound | | | | | Charge potential |
|---|---|---|---|---|---|---|
| | Type | mmol | mol/L[1)] | Solvent | Positive electrode catalyst | V |
| Example 14 | Compound B[3)] | 0.06 | 0.012 | EC:DEC(3:7)[2)] | Electrolytic managese dioxide | 3.50 |
| Example 15 | Compound A[4)] | 0.018 | 0.0036 | EC:DEC(3:7) | Electrolytic managese dioxide | 3.65 |
| Example 16 | Compound C[5)] | 0.056 | 0.0112 | EC:DEC(3:7) | Electrolytic managese dioxide | 3.45 |
| Example 17 | Compound B | 0.025 | 0.005 | 3-Methoxypropionitrile | Compound X[6)] | 3.30 |
| Example 18 | Compound B | 0.25 | 0.05 | 3-Methoxypropionitrile | Compound X | 3.20 |
| Example 19 | Compound B | 0.025 | 0.005 | EC:DEC(3:7) | Compound X | 3.45 |
| Comparative Example 4 | — | 0 | 0 | EC:DEC(3:7) | Electrolytic managese dioxide | 4.00 |
| Example 20 | — | 0 | 0 | 3-Methoxypropionitrile | Compound X | 3.60 |
| Example 21 | — | 0 | 0 | EC:DEC(3:7) | Compound X | 3.50 |

[1)]Amount of stable radical compound added per 1 L of mixture of solvent and supporting catalyst.
[2)]EC: ethylene carbonate, DEC: diethyl carbonate, and "(3:7)" is the mixing ratio by volume.
[3)]Compound B: 2,2,6,6-tetramethylpiperidine 1-oxyl
[4)]Compound A: N-(3,3,5,5-tetramethyl-4-oxylpiperidyl)pyrene-1-carboxamide
[5)]Compound C: 4-amino-2,2,6,6-tetramethylpiperidine 1-oxyl
[6)]Compound X: radical polymer having a nitroxyl radical Comparative Example 4

An electrochemical battery in Comparative Example 4 was produced as in Example 14, except that compound B was not added. The resulting electrochemical battery was subjected to a charge-discharge test as in Example 14. FIG. 12 shows the charging curve.

Example 15

Figure 13:
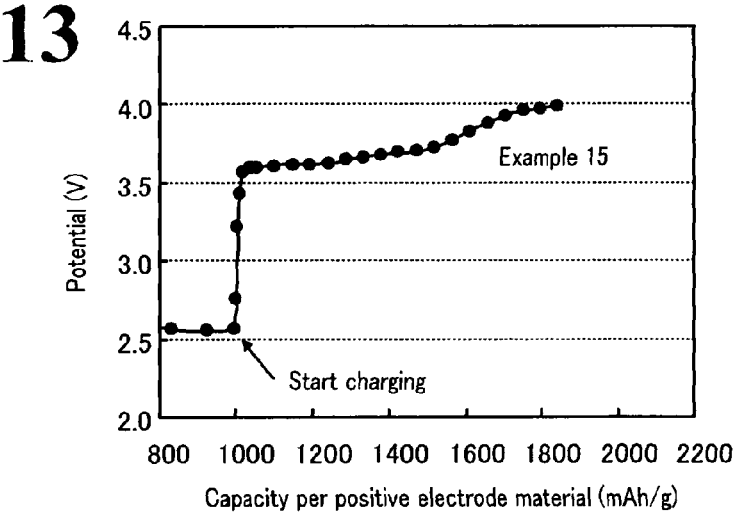
FIG. 13 is a graph showing the relationship between the voltage and the capacity in a charge test in Example 15.

An electrochemical battery in Example 15 was produced as in Example 14, except that 0.018 mmol of N-(3,3,5,5-tetramethyl-4-oxylpiperidyl)pyrene-1-carboxamide (compound A) was used in place of compound B. The resulting electrochemical battery was subjected to a charge-discharge test as in Example 14. FIG. 13 shows the charging curve.

Example 16

Figure 14:
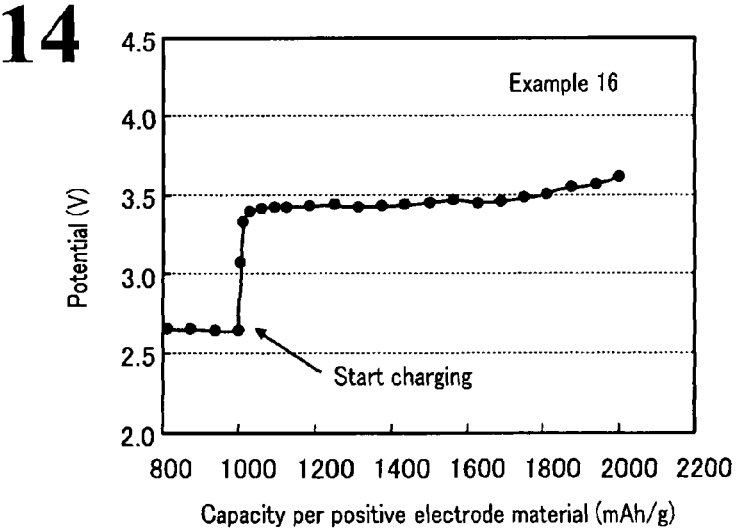
FIG. 14 is a graph showing the relationship between the voltage and the capacity in a charge test in Example 16.

An electrochemical battery in Example 16 was produced as in Example 14, except that 0.056 mmol of 4-amino-2,2,6,6- tetramethylpiperidine 1-oxyl (compound C, manufactured by Tokyo Chemical Industry Co., Ltd.) was used in place of compound B. The resulting electrochemical battery was subjected to a charge-discharge test as in Example 14. FIG. 14 shows the charging curve.

Example 17

Figure 15:
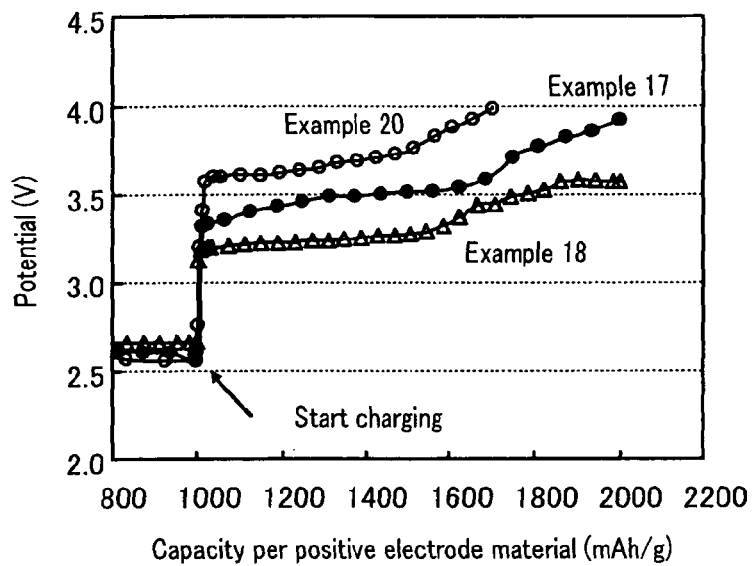
FIG. 15 is a graph showing the relationship between the voltage and the capacity in a charge test in each of Examples 17, 18 and 20.

A positive electrode was produced as in Example 14, except that the positive electrode mixture formed by dry-mixing 166 mg of a radical polymer (compound X) having a nitroxyl radical, 116 mg of Ketjen Black (ECP-6000, manufactured by Mitsubishi Chemical Corporation), and 24.8 mg of a Teflon powder (manufactured by Daikin Industries, Ltd.) with a mortar and then forming into a sheet was used. Furthermore, a nonaqueous electrolytic solution was prepared as in Example 14, except that 5 mL of 3-methoxypropionitrile (manufactured by Wako Pure Chemical Industries, Ltd.) in place of the solution containing ethylene carbonate and diethyl carbonate was used as the solvent and that the amount of compound B added was 0.025 mmol. An electrochemical battery in Example 17 was produced with these components in the same way as in Example 14. The resulting electrochemical battery was subjected to a charge-discharge test as in Example 14, except that the charging current was 20 mA per gram of the positive electrode mixture in place of 10 mA per gram of the positive electrode mixture. FIG. 15 shows the charging curve. FIG. 15 also shows the charging curves in Examples 18 and 20 described below.

The radical polymer (compound X) having a nitroxyl radical was synthesized as follows: According to Chem. Phys. Lett. Vol. 359, p. 351 (2002), a 2,2,6,6-tetramethylpiperidine methacrylate monomer was polymerized with 2,2'-azobisisobutyronitrile as an initiator, followed by oxidation with 3-chloroperbenzooic acid to afford the radical polymer. The radical polymer had a number-average molecular weight of 92,000 and a weight-average molecular weight of 229,000.

Example 18

An electrochemical battery in Example 18 was produced as in Example 17, except that the amount of compound B added was 0.25 mmol. The resulting electrochemical battery was subjected to a charge-discharge test as in Example 17. FIG. 15 shows the charging curve.

Example 19

Figure 16:
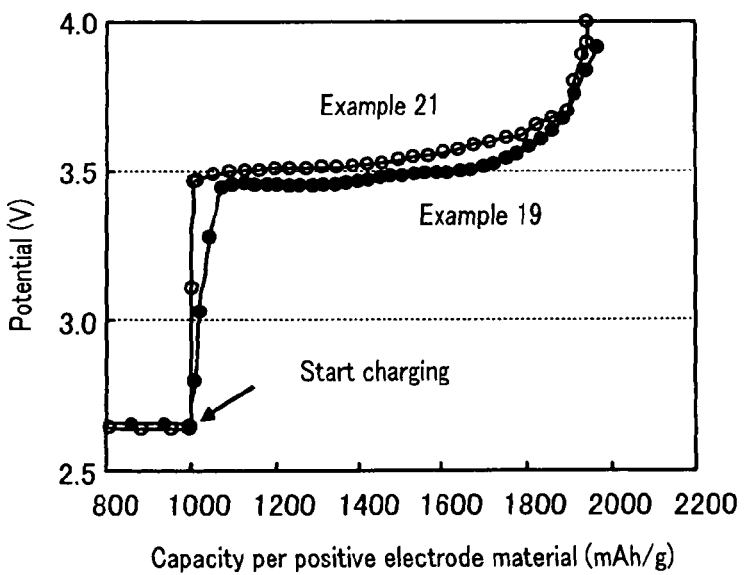
FIG. 16 is a graph showing the relationship between the voltage and the capacity in a charge test in each of Examples 19 and 21.

An electrochemical battery in Example 19 was produced as in Example 17, except that a solution containing ethylene carbonate and diethyl carbonate (the volume mixing ratio of the solvents was 3:7) in place of 3-methoxypropionitrile (manufactured by Wako Pure Chemical Industries, Ltd.) was used as the solvent and that the amount of compound B added was 0.025 mmol. The resulting electrochemical battery was subjected to a charge-discharge test as in Example 12. FIG. 15 shows the charging curve. FIG. 16 also shows Example 21 described below.

Example 20

An electrochemical battery in Example 20 was produced as in Example 17, except that compound B was not added. The resulting electrochemical battery was subjected to a charge-discharge test as in Example 17. FIG. 15 shows the charging curve.

Example 21

An electrochemical battery in Example 21 was produced as in Example 19, except that compound B was not added. The resulting electrochemical battery was subjected to a charge-discharge test as in Example 14. FIG. 16 shows the charging curve.

Table 6 and FIGS. 12 to 14 clearly showed that with respect to the lithium air batterys including the positive electrodes containing electrolytic manganese dioxide serving as a positive electrode catalyst, in each of Examples 14 to 16 in which the nonaqueous electrolytic solutions contained the stable radical compounds, the charging potential was reduced compared with Comparative Example 4 in which a stable radical compound was not contained. In particular, in each of Example 14 in which compound B was used and Example 16 in which compound C was used, the charging potential was further reduced. It was thus presumed that in each of the stable radical compounds, the atomic group linked to the stable radical skeleton was preferably hydrogen or an amino group. Table 6 and FIGS. 15 and 16 clearly showed that with respect to the lithium air batterys including the positive electrodes containing compound X, which is a radical polymer having a nitroxyl radical, in each of Examples 17 to 19 in which the nonaqueous electrolytic solutions contained the stable radical compound, the charging potential was reduced compared with Examples 20 and 21 in which a stable radical compound was not contained. In particular, in each of Examples 17 and 18 in which 3-methoxypropionitrile was used as the solvent, the charging potential was further reduced. It was thus presumed that 3-methoxypropionitrile was preferably used as the solvent. Furthermore, in Example 18 in which the amount of compound B added was 0.25 mmol, the charging potential was further reduced compared with Example 17 in which the amount of compound B added was 0.025 mmol. In each of Examples 17 to 21 in which compound X was used as the positive electrode catalyst, the charging potential was further reduced compared with Examples 14 to 16 and Comparative Example 4 in which electrolytic manganese dioxide was used as the positive electrode catalyst. It was thus presumed that a polymer containing a stable radical compound, e.g., compound X, was preferred as the positive electrode catalyst.

Japanese Unexamined Patent Application Publication No. 2005-228712 describes a secondary battery including an electrolytic solution containing a compound having a stable radical skeleton. The aim of this document is to inhibit the growth of dendrite on a surface of a negative electrode to improve cycle characteristics of a storage device. In the lithium air battery of the present invention, the charging potential is reduced by reducing the oxygen overvoltage and the like. In this regard, there is no description or suggestion in the foregoing document.

The present invention claims priority to Japanese Patent Application No. 2008-075464 filed in the Japanese Patent Office on Mar. 24, 2008, Japanese Patent Application No. 2008-192297 filed in the Japanese Patent Office on Jul. 25, 2008, Japanese Patent Application No. 2008-194964 filed in the Japanese Patent Office on Jul. 29, 2008, and Japanese Patent Application No. 2009-008532 filed in the Japanese Patent Office on Jan. 19, 2009, the entire contents of which are incorporated herein by reference.

What is claimed is:
1. An alkali metal air battery comprising:
   a negative electrode containing a negative-electrode active material;
   a positive electrode using oxygen as a positive-electrode active material; and a nonaqueous ion-conducting medium configured to conduct alkali metal ions and arranged between the negative electrode and the positive electrode, wherein the positive electrode contains a compound having a stable radical skeleton and serving as a redox catalyst for oxygen, the stable radical skeleton having a spin density of $10^{19}$ spins/g or more, and the compound having a stable radical skeleton is not the negative-electrode active material and is not the positive-electrode active material.

2. The alkali metal air battery according to claim 1, wherein the negative electrode does not contain the compound having the stable radical skeleton.

3. The alkali metal air battery according to claim 1, wherein the ion-conducting medium also contains the compound having the stable radical skeleton.

4. The alkali metal air battery according to claim 1, wherein the redox catalyst accounts for 0.01% to 60% by weight of the total weight of the positive electrode.

5. The alkali metal air battery according to claim 1, wherein the redox catalyst is a polymer having the stable radical skeleton.

6. The alkali metal air battery according to claim 1, wherein the redox catalyst is a monomolecular compound having the stable radical skeleton.

7. The alkali metal air battery according to claim 6, wherein the redox catalyst is the compound having a structure in which the stable radical skeleton is linked to a polycyclic aromatic ring.

8. The alkali metal air battery according to claim 7, wherein the polycyclic aromatic ring is linked to the radical skeleton with a spacer selected from the group consisting of an amide bond, an ester bond, a urea bond, a urethane bond, a carbamide bond, an ether bond, and a sulfide bond.

9. The alkali metal air battery according to claim 8, wherein the redox catalyst is supported on a carrier in a monomolecular state.

10. The alkali metal air battery according to claim 9, wherein the redox catalyst is supported on the carrier by ultrasonic irradiation.

11. The alkali metal air battery according to claim 8, wherein the redox catalyst is supported on a carbonaceous carrier having a cyclic structure.

12. The alkali metal air battery according to claim 1, wherein the ion-conducting medium contains the compound having a structure with the stable radical skeleton and a polycyclic aromatic ring linked to the radical skeleton, the compound serving as a redox catalyst for oxygen.

13. The alkali metal air battery according to claim 12, wherein the redox catalyst contains the radical skeleton and the polycyclic aromatic ring linked to the radical skeleton with a spacer selected from the group consisting of an amide bond, an ester bond, a urea bond, a urethane bond, a carbamide bond, an ether bond, and a sulfide bond.

14. The alkali metal air battery according to claim 12, wherein the redox catalyst is a monomolecular compound having a stable radical skeleton.

15. The alkali metal air battery according to claim 1, wherein the ion-conducting medium is a nonaqueous electrolytic solution containing the compound having a structure with the stable radical skeleton.

16. The alkali metal air battery according to claim 15, wherein the radical skeleton is 2,2,6,6-tetramethylpiperidine 1-oxyl, and the compound has a structure in which at least one selected from the group consisting of a hydrogen atom, aromatic rings, and an amino group is bonded to the radical skeleton.

17. The alkali metal air battery according to claim 15, wherein the positive electrode contains at least one of a radical polymer having a nitroxyl radical and electrolytic manganese dioxide serving as the redox catalyst.

18. The alkali metal air battery according to claim 1, wherein the radical skeleton has a nitroxyl radical.

19. The alkali metal air battery according to claim 1, wherein the alkali metal air battery is used as a rechargeable secondary battery.

20. The alkali metal air battery according to claim 1, wherein the negative electrode is capable of occluding and discharging lithium ions, and the ion-conducting medium conducts lithium ions.

* * * * *